(12) United States Patent
Feinberg

(10) Patent No.: US 12,316,745 B1
(45) Date of Patent: May 27, 2025

(54) SYSTEM AND METHODS FOR A SYMMETRIC ENCRYPTION CIPHER WITH STEGANOGRAPHICALLY EMBEDDED ACCESS CONTROLS

(71) Applicant: Leeward Digital, LLC, Henderson, NV (US)

(72) Inventor: Michael Feinberg, San Clemente, CA (US)

(73) Assignee: Leeward Digital, LLC, Henderson, NV (US)

( * ) Notice: Subject to any disclaimer, the term of this patent is extended or adjusted under 35 U.S.C. 154(b) by 174 days.

(21) Appl. No.: 18/331,778

(22) Filed: Jun. 8, 2023

(51) Int. Cl.
  *H04L 9/08* (2006.01)
  *G06F 21/46* (2013.01)

(52) U.S. Cl.
  CPC .......... *H04L 9/0816* (2013.01); *G06F 21/46* (2013.01)

(58) Field of Classification Search
  CPC .............................. H04L 9/0816; G06F 21/46
  USPC ........................................................ 380/44
  See application file for complete search history.

(56) References Cited

U.S. PATENT DOCUMENTS

| | | |
|---|---|---|
| 6,035,398 A | 3/2000 | Bjorn |
| 10,873,450 B2 | 12/2020 | Keselman et al. |
| 10,892,889 B2 | 1/2021 | Coleridge et al. |
| 11,379,603 B2 * | 7/2022 | Dande .................... G06F 21/602 |
| 11,444,754 B1 * | 9/2022 | Shaked .................. H04L 9/0894 |
| 2013/0019106 A1 * | 1/2013 | Fischer .................... G06F 21/60 713/189 |
| 2017/0078255 A1 * | 3/2017 | Nejadian .................. H04L 9/083 |
| 2020/0372006 A1 * | 11/2020 | Boelderl-Ermel .... G06F 16/245 |
| 2021/0209202 A1 * | 7/2021 | Dande ...................... H04L 63/08 |
| 2021/0209235 A1 * | 7/2021 | Dande ...................... G06N 20/00 |
| 2023/0418953 A1 * | 12/2023 | Dobbelaere ........... G06F 21/602 |
| 2024/0403462 A1 * | 12/2024 | Freeman ............. G06F 21/6218 |

* cited by examiner

Primary Examiner — Samson B Lemma
(74) Attorney, Agent, or Firm — Constance F. Ramos

(57) ABSTRACT

A computerized method for a symmetric encryption cipher with steganographically embedded access controls includes generating a data structure relating to a cryptographic key of an invariant size and a variable encryption strength. The data structure is configured to dynamically allocate a plurality of adjacent data stores containing: an initialization vector (IV) for deriving a cryptographic key; a variable-length padding space dynamically coupled and inversely related to the variable encryption strength of the cryptographic key; and a seed array relating to the cryptographic key. User-authentication information, such as biometric data and/or access control information, may be steganographically embedded in the variable padding space of the cryptographic key. The method obtains a user-authorization dataset and defines a cryptographic key data store to include the IV dataset, and then merges the user-authentication dataset with the IV dataset, thereby creating a data encryption key, and stores it in the cryptographic key data store.

14 Claims, 19 Drawing Sheets

SYSTEM AND METHODS FOR A SYMMETRIC ENCRYPTION CIPHER WITH STEGANOGRAPHICALLY EMBEDDED ACCESS CONTROLS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNOLOGY FIELD

The present invention generally relates to cryptographic processes and cryptographic protocols whereby a shared secret becomes available to two or more parties for subsequent uses, and more particularly, to a method and apparatus for cryptographic key establishment and use in symmetric encryption applications.

BACKGROUND

Cybersecurity and the protection of binary data, stored files, and live streaming transmissions have become an increasing topic of concern for many. Empowering individuals, businesses, and governments with precision instruments for safeguarding data requires sound cryptography and specific tools designed to support the way people work in the real world. While the use of cryptographic keys and processes based on the current suite of public domain ciphers (e.g., NIST ciphers) may be effective for encrypting data files and streaming binary data with contemporary computing systems, such methods present several concerns as computing power increases and codebreaking schemes become more sophisticated. Thus, for example, AES256, RSA, Triple DES each may be successfully used to encrypt binary data; however, in the age of quantum computing, cryptographic methods and systems based on these standards are likely to become increasingly vulnerable to attack in the very near future. Thus, currently available encryption techniques are no longer adequate in the face of modern cryptanalytic methods and supercomputing power. In addition, encryption of streaming video presents its own special challenges with respect to speed of encryption/decryption while maintaining high fidelity of the decrypted images.

Thus, there is a need in the art for a method and apparatus that permits stronger and faster encryption of data and information than what is currently available. Such a method and apparatus should be capable robust, high-fidelity encryption that can resist, for example, quantum computer codebreaking cyber-attacks from nefarious actors.

BRIEF SUMMARY OF THE EMBODIMENTS

The system and methods of the present disclosure overcome the disadvantages of prior art. For example, a system of one or more computing devices can be configured to perform particular operations or actions, as disclosed herein, by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

A general aspect of the system and methods for a symmetric encryption cipher disclosed herein includes a non-transitory computer-readable program which, when executed on a computing device of a data processing system, causes the computing device to generate a data structure for a cryptographic key having an encryption strength, the data structure comprising a plurality of data stores including: (1) an encryption key data store having a size that increases with the encryption strength; and (2) a padding data store having a size that decreases with the encryption strength, such that a sum of the size of the encryption key data store and the size of the padding data store is constant for a range of encryption strengths. Additionally, the data structure may further comprise an access control data store operable to store a user-authentication dataset steganographically within the cryptographic key.

One general aspect of the system and methods for a symmetric encryption cipher disclosed herein includes a non-transitory computer-readable program which generates a data structure relating to a cryptographic key of an invariant size and a variable encryption strength. Such data structure includes a plurality of adjacent data stores, including: (a) a first data store having a first variable size, where the first data store is operable to contain a first dataset representing an initialization vector of a cipher relating to the cryptographic key, and where the first variable size corresponds to the variable encryption strength of the cryptographic key; (b) a second data store operable to contain a second dataset representing a delimiter space associated with the variable encryption strength of the cryptographic key, where the second data store is adjacent to the first data store; (c) a third data store having a second variable size, where the third data store is operable to contain a third dataset representing a variable padding space of the cryptographic key, and where the third data store is separated from the first data store by at least the second data store in the plurality of adjacent data stores, and where the second variable size is dynamically coupled to the first variable size and inversely related to the variable encryption strength of the cryptographic key; and (d) a fourth data store having a third variable size, where the fourth data store is operable to contain a fourth dataset representing a seed array relating to the cryptographic key. Other embodiments of this aspect include corresponding computer system(s), device(s), apparatus, and computer programs recorded on one or more computer storage devices, configured to perform the actions of the methods.

Implementations may also include one or more of the following features: (e) a central data store portion positioned within the plurality of adjacent data stores to define a dynamic delimiter within the data structure, and where the fourth data store is positioned within the data structure symmetrically with respect to the dynamic delimiter and the first data store; (f) a fifth data store operable to contain a fifth dataset representing a second delimiter space associated with the variable encryption strength of the cryptographic key, where the fifth data store is adjacent to the fourth data store and proximal to the central data store portion; and (g) a sixth data store having a fourth variable size equal to the second variable size, where the sixth data store is operable to contain a sixth dataset representing a second variable padding space of the cryptographic key, where the sixth data store is separated from the fourth data store by at least the fifth data store in the plurality of adjacent data stores, and where the fourth variable size is dynamically coupled to the third variable size and inversely related to the variable encryption strength of the cryptographic key.

In some embodiments and implementations, the non-transitory computer-readable program further causes the computing device to store, within the third data store, an access control dataset relating to information used to enable encryption and decryption of a computerized information dataset using the cryptographic key. The access control dataset may include biometric data of a user of the computing device, and/or an access control dataset identifying a portion of the computerized information dataset subject to decryption by the cryptographic key. The plurality of adjacent data stores may also include a pair of related terminal stores-a first terminal store and a second terminal store-which together collectively contain or define a terminal dataset associated with a key-encryption-key dataset, and where the key-encryption-key dataset is operable to be used by the computing device to encrypt at least a portion of the access control dataset. In some embodiments, the terminal dataset indicates availability of the access control dataset stored within the third data store. Alternatively and more generally, in some embodiments, the terminal dataset is a single dataset stored within a single data store of the plurality of adjacent data stores. Implementations of the described techniques may include hardware, a method or process, or computer software on a computer-accessible medium.

One general aspect includes a method as implemented, for example, in a non-transitory computer-readable program which, when executed in a computing device of a data processing system, causes the device to: (a) obtain a user-authentication dataset associated with encrypting and decrypting a computerized data file; (b) define a cryptographic key data structure of invariant size, where the cryptographic key data structure may include an encryption-key data store of variable key-bit space and a padding data store of variable padding-bit space; and (c) generate a key-encryption-key dataset and then encrypt the user-authentication dataset using the key-encryption-key dataset, thereby generating an encrypted authentication dataset. In such implementation, the program also includes embedding the encrypted authentication dataset within the padding data store of variable padding space, and then storing the key-encryption-key dataset within at least one data store of the cryptographic key data structure. Other embodiments of this aspect include corresponding computer system(s), device(s), apparatus, and computer programs recorded on one or more computer storage devices, configured to perform the actions of the methods.

Implementations may also include one or more particularly unique features of the user-authentication dataset associated with encrypting and decrypting the computerized data file, such as: (d) biometric data of a user of the data processing system; (e) a multi-factor authentication dataset; (f) an access-control dataset encoding a set of information associated with conditional access to the computerized data file, for example, by including a subset of access-control data encoding redaction information associated with restricted access to a portion of the computerized data file. Such implementations may further include a feature that merges the user-authentication dataset with a data-encryption-key dataset, thereby creating a restricted access, cryptograph initialization vector dataset relating to the data-encryption-key dataset, and then stores the restricted access cryptograph initialization vector dataset in the cryptographic key data structure. Implementations of the described techniques may include hardware, a method or process, or computer software on a computer-accessible medium.

Another more general aspect of the system and methods of the symmetric cipher includes a non-transitory computer-readable program which, when executing on a computing device, causes the computing device of a data processing system, to: (a) obtain a computerized data file; (b) establish, in the data processing system, an encryption key strength from a plurality of variable key strengths; (c) access a user-authentication dataset relating a user of the data processing system; (d) generate an encryption key dataset derived from the user-authentication dataset and the encryption key strength; (e) encrypt the computerized data file using the encryption key dataset, thereby obtaining an encrypted data file; and (f) store, in the data processing system, the encrypted data file and the encryption key dataset. More specific embodiments of this aspect include corresponding computer system(s), device(s), apparatus, and computer programs recorded on one or more computer storage devices, configured to perform the actions of the methods.

Such implementations may further include one or more of the following features: (f) the user-authentication dataset may include a multi-factor authentication dataset, and/or biometric data relating to the user of the data processing system; (g) the non-transitory computer-readable program is further operable to cause the computing device to (i) merge the user-authentication dataset with a cryptographic initialization vector dataset associated with the encryption key dataset, thereby generating a restricted access cryptographic initialization vector dataset associated with the encryption key dataset, and (ii) replace the cryptographic initialization vector dataset with the restricted access cryptographic initialization vector dataset associated with the encryption key dataset. Implementations of these described techniques may include hardware, a method or process, or computer software on a computer-accessible medium.

One general aspect includes a method, as embodied, for example, in a non-transitory computer-readable program which, when executing on a computing device of a data processing system, causes to device to: (a) obtain an encrypted ciphertext data element; (b) identify an encryption key dataset associated with the encrypted ciphertext data element; (c) access a user-authentication dataset relating to a user of the data processing system and embedded in the encryption key dataset; (d) extract a restricted access cryptographic initialization vector dataset from the encryption key dataset, based upon the user-authentication dataset and the encryption key dataset, where the restricted access cryptographic initialization vector dataset is associated with decryption of a portion of the encrypted ciphertext data element; and (e) decrypt the portion of the encrypted ciphertext data element using the restricted access cryptographic initialization vector dataset, thereby generating a partially decrypted plaintext data element (i.e., a redacted version of the encrypted plaintext). Other embodiments of this aspect include corresponding computer system(s), device(s) apparatus, and computer program(s) recorded on one or more computer storage devices, configured to perform the actions of the methods. Additional implementations may further include aspects where the user-authentication dataset includes biometric and/or multi-factor authentication data relating to the user; and/or where the encrypted ciphertext data element may include streaming data; and/or where the partially decrypted plaintext data element includes streaming data. Such implementations of each of the described techniques may include hardware, a method or process, or computer software on a computer-accessible medium.

Another general aspect of the system and methods of the present disclosure includes a method, for example, as embodied in a non-transitory computer-readable program, performed or executed to: (a) define a cryptographic key data store; (b) obtain a user-authentication dataset; (c) merge the user-authentication dataset with a cryptographic initialization vector dataset, thereby creating a data-encryption-key dataset; and (d) store the data-encryption-key dataset in the cryptographic key data store. Embodiments of this aspect include corresponding computer system(s), device(s), apparatus, and computer program(s) recorded on one or more computer storage devices, configured to perform the actions of the methods. Such implementations may include a non-transitory computer-readable program where the user-authentication dataset includes biometric data and/or where a non-transitory computer-readable program, when executed on the computing device of the data processing system, further causes the computing device to encrypt at least a portion of the user-authentication dataset, thereby creating an encrypted authentication dataset, and then store the encrypted authentication dataset in the cryptographic key data store. Implementations of the described techniques may include hardware, a method or process, or computer software on a computer-accessible medium.

The above-described features, together with the various ancillary provisions and features which will become apparent to those skilled in the art from the following detailed description, are attained by the system and methods for a symmetric encryption cipher of the present disclosure, preferred embodiments thereof being shown with reference to the accompanying drawings, by way of example only.

DETAILED DESCRIPTION

Figure 1A:
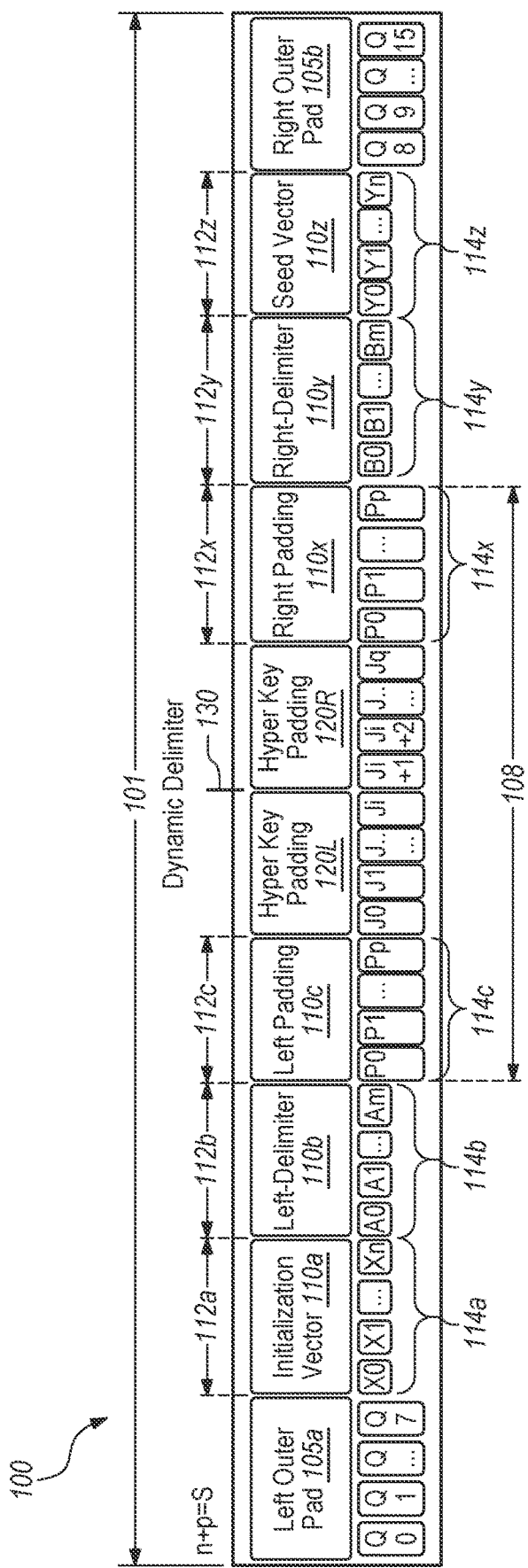
FIGS. 1A and 1B collectively illustrate a first embodiment of a data structure for a cryptographic key of the present disclosure.

A system and method for providing a modular, symmetric, streaming encryption cipher with steganographically embedded access control information is described herein. In some embodiments, symmetric key primitives are generated by a computing device of a data processing system automatically (or manually) at runtime via a localized cryptographically secure random number generator (CSRNG), a remote online random number generator, or physical hardware random number generator accessory.

In one embodiment, an operator may select a desired encryption strength from pre-determined key-bit space constants. Plug-and-play-style random number generation results in the instantiation of a preliminary initialization vector and a seed array. Once instantiated, additional inert and benign random number generation is algorithmically applied to expand dynamically the overall key-bit space with a pseudo-random level of additional entropy injection. Using this expanded space, the additional inert and benign random numbers provide available key-bit space for steganographically embedding encoded access control information, hereinafter referred to as an "access control list" or "ACL" The use of access control lists steganographically embedded with cryptographic key materials, and in combination with multi-factor authentication (e.g., biometrics), enables a "bespoke" style of symmetric cryptography that provides stronger and faster encryption of data and information than what is currently available, to address the ever-growing cyber-attack concerns. Inert and benign random number generation creates numbers to be used as padding, meant for obfuscation purposes, and not part of the encryption.

Thus, the system and methods disclosed herein offer a solution to enhance a symmetric encryption cipher via steganographically embedded access controls. This solution encrypts data at variable encryption strengths, and allows a content owner to redact segments of data for specific users while sharing a single key for all users. For example, using the symmetric encryption cipher disclosed herein, a security clearance user is enabled to encrypt a multi-page document and share the encryption key and entire ciphertext with two or more recipients; however, although each recipient is provided with the same key, they will only be able to decrypt a portion of the ciphertext using that key, depending upon the specific access controls defined separately for each recipient and embedded in the key. (For example: a security clearance user encrypts a two-page document and shares and encrypted document and symmetric key with five people; three of them cannot see page two.) Thus, the symmetric encryption cipher using steganographically embedded access controls of the present disclosure solves one problem of encryption key sharing, which is currently an "all-or-nothing" proposition.

The present disclosure provides a detailed description of various exemplary embodiments for the purpose of conveying a basic understanding of cryptographic processes implementing and relating to the symmetric encryption cipher with embedded access controls disclosed herein. It should be noted that the exemplary embodiments described herein are not exhaustive and do not encompass all possible aspects or embodiments, nor do they limit the scope of the claims appended herein. However, it will be evident to those skilled in the relevant field that the concepts disclosed herein can be implemented without necessarily requiring every specific detail mentioned. The following general and detailed descriptions serve as illustrations and explanatory examples and are not intended to be restrictive in nature.

This disclosure pertains to a cryptographic component or encryption/decryption application designed for converting plaintext data into ciphertext by employing specific initial variables. The ciphertext can only be transformed back into its original form through the utilization of the same initial variables utilized during encryption. In some embodiments, the disclosed embodiments encompass a security access control group that restricts access to selected portions or segments of the ciphertext that are rendered via the cryptographic process. Operator-specified access controls include restrictions rendering designated sections within the ciphertext inaccessible to individuals who lack specific user-authentication components, such as a software license identification number and/or a biometric data file.

One embodiment of each of the methods described herein is in the form of a computer program that executes on a processing system, e.g., one or more processors or computing devices that are part of a data processing system. Thus, as will be appreciated by those skilled in the art, embodiments of the present invention may be embodied as a method, an apparatus such as a special purpose apparatus, an apparatus such as a data processing device, or a carrier medium, e.g., a computer program product. The carrier medium carries one or more computer-readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer-readable medium may be used including, for example, a USB flash memory, an external or internal storage device such as a hard disk drive (HDD), a solid-state drive (SSD), CD, DVD and Blu-Ray optical storage media, mobile phone storage medium, or a network device storage medium.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system. Embodiments disclosed herein, for example, are implemented in Java, although other languages such as C, C++, C#.NET, Objective-C, Rust, Go, etc. may be used.

Generating the Symmetric Key Structure

The disclosed embodiments employ cryptographically secure random number generation (CSRNG). One basis for high quality cryptography is an entropic source for irreversible input variables. Some embodiments include a default CSRNG process, which is typically supplied with modern operating systems, such as, for example such as, for example/dev/random and/dev/urandom (Unix-like systems), or CryptGenRandom and BCryptGenRandom (Windows OS). Such default CSRNG processes may employ an initialization vector and a seed array. Further, in some embodiments, a flexible user interface design allows a user to select alternative sources of entropy either via hardware, online, or offline external process.

Figure 1B:
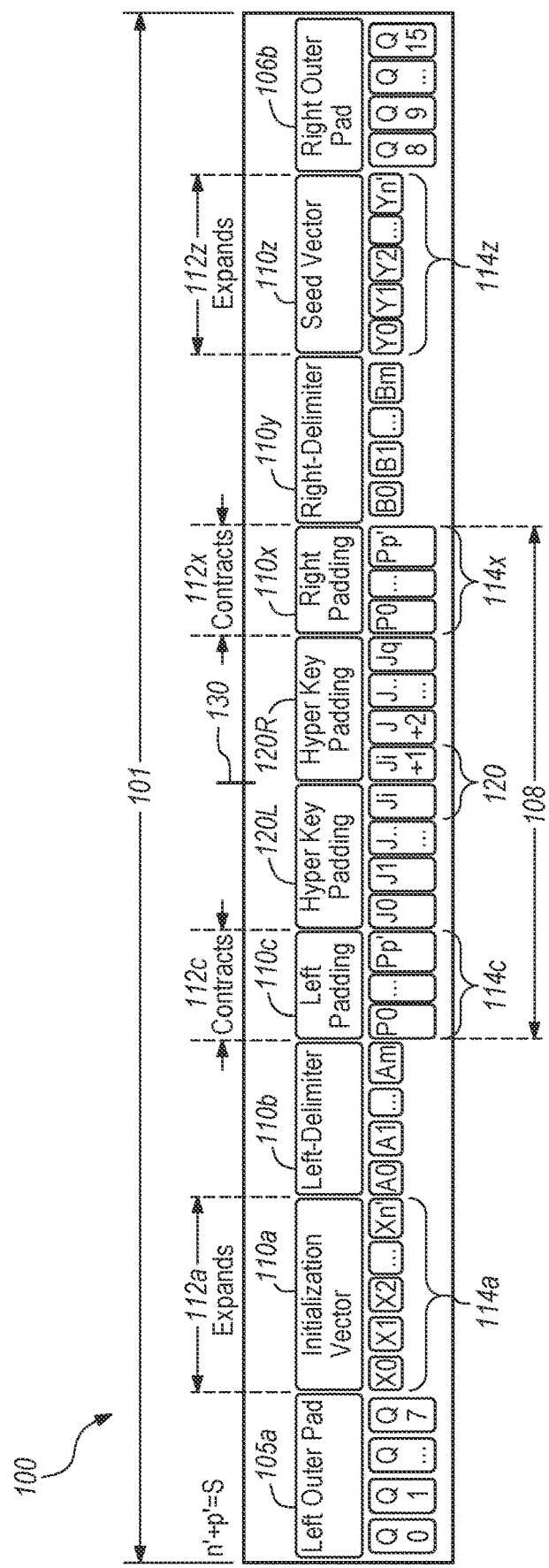

FIGS. 1A and 1B collectively illustrate a first embodiment of a cryptographic key data structure 100 (also referred to herein as a data structure 100) of the present disclosure. Referring to FIG. 1A, cryptographic key data structure 100 comprises a fixed size (e.g., length) and includes: (a) a section 110a for storing a cryptographic initialization vector (IV) dataset 114a of variable size 112a relating to a selectable or assignable strength of a cryptographic key 101 (as further described below); (b) a padding section 108 of variable size (e.g., length) that is inversely related to the strength of cryptographic key 101 and which is coupled to the size 112a of initialization vector dataset 114a. In the embodiment shown, data structure 100 also includes a section 110z for storing a seed array dataset 114z for the CSRNG. In the embodiments shown and described herein, seed array dataset 114z is referred to as a seed vector. In the embodiment shown, padding section 108, as further described below, comprises a left padding section 110c, a right padding section 110x, and two inner, sections designated as "Hyper Key" padding (120L and 120R) which are separated by a dynamic delimiter 130 (further described below).

In prior art systems, the strength of a cryptographic key may be determined by its length. In contrast, the data structure embodiments of the present disclosure mask the length of the cryptographic key by also including a padding section that decreases in length with increases in cryptographic key strength, making it difficult or impossible to determine the cryptographic key strength from its length. Thus, FIG. 1B illustrates one embodiment of a reciprocal relationship between the sizes 112a and 112z of the initialization vector and seed array data stores, respectively, and the sizes 112c and 112x of the left and right padding sections, respectively, for data structure 100. More specifically, FIG. 1B illustrates the reciprocal relationships between the size 112a of the initialization vector and the size 112c of the left padding, and the size 112z of the seed array and the size 112x of the right padding, which reciprocal relationships effectively hide the strength of cryptographic key 101. For example, when a user of the system and method disclosed herein is permitted to increase lengths (i.e., sizes) 112a and 112c of the initialization vector and seed array, thereby increasing cryptographic key strength, the corresponding data stores 110a and 110z expand accordingly in their variable lengths (i.e., sizes), while portions 110c and 110x of padding section 108 ("Left Padding" and "Right Padding", respectively) correspondingly contract in their variable lengths; thus, in this manner, the size of the padding section 108 is inversely related to cryptographic key strength and coupled to the size of the initialization vector. This coupled relationship between padding bit-space and IV bit-space allows cryptographic key 101 to maintain a fixed length, even though its strength may vary.

By way of illustration, FIG. 1A and FIG. 1B show particular embodiments of cryptographic key data structure 100, shown for example and without limitation at different key strengths (FIG. 1A at 512-bit strength; FIG. 1B at 1024-bit strength). As shown in these embodiments, an exemplary data structure may include a symmetric configuration (e.g., left side L/right side R) for a plurality of adjacent data stores symmetrically positioned about a dynamic delimiter 130 and/or central data store portion 120 of the cryptographic key 101 stored within data structure 100. Datasets stored within data structure 100 may include (by way of illustration and without limitation): benign padding stored in Left Outer Pad 105a (also referred to herein as first terminal store 105a), which may be adjacent to IV encryption key data stored in Initialization Vector data store 110a, which may be adjacent to a dataset stored in Left-Delimiter data store 110b, which may be adjacent to benign padding stored in a Left Padding store 110c, which may be adjacent to Hyper Key Padding 120L (further described below), which may be adjacent to an additional dataset of Hyper Key Padding 120R (further described below), which may be adjacent to benign padding stored in a Right Padding 110x, which may be adjacent to a dataset stored in Right-Delimiter data store 110y, which may be adjacent to seed array encryption key data stored in Seed Vector data store 110z, which may be adjacent to benign padding stored in Right Outer Pad 105b (also referred to herein as second terminal store 105b). Such exemplary data structure provides one embodiment of a plurality of adjacent data stores configured to hold symmetric key material, dynamically padded with CSRNG, as further described herein.

Thus, referring to FIG. 1A, one general aspect of the system and methods for a symmetric encryption cipher disclosed herein includes a non-transitory computer-readable program which, when executed on a computing device of a data processing system, generates a data structure 100 relating to a cryptographic key 101 of an invariant size S and a variable encryption strength (further described below). As shown in FIG. 1A, in one embodiment, data structure 100 includes a plurality of adjacent data stores, including: (a) a first data store 110a having a first variable size 112a, where the first data store 110a is operable to contain a first dataset 114a representing an initialization vector of a cipher relating to the cryptographic key 101, and where the first variable size 112a corresponds to the variable encryption strength S of cryptographic key 101; (b) a second data store 110b operable to contain a second dataset 114b representing a delimiter space associated with the variable encryption strength of the cryptographic key 101, where the second data store 110b is adjacent to the first data store 110a; (c) a third data store 110c having a second variable size 112c, where the third data store 110c is operable to contain a third dataset 114c representing a variable padding space of the cryptographic key 101, and where the third data store 110c is separated from the first data store 110a by at least the second data store 110b in the plurality of adjacent data stores, and where the second variable size 112c is dynamically coupled to the first variable size 112a and inversely related to the variable encryption strength S of the cryptographic key 101; and (d) a fourth data store 110z having a third variable size 112z, where the fourth data store 110z is operable to contain a fourth dataset 114z representing a seed array relating to the cryptographic key 101. Other embodiments of this aspect include corresponding computer system(s), device(s), apparatus, and computer programs recorded on one or more computer storage devices, configured to perform the actions of the methods.

Referring to FIG. 1B, implementations may also include one or more of the following features: (e) a central data store portion 120 positioned within the plurality of adjacent data stores to define a dynamic delimiter 130 within the data structure 100, and where the fourth data store 110z is positioned within the data structure 100 symmetrically with respect to the dynamic delimiter 130 and the first data store 110a; (f) a fifth data store 110y operable to contain a fifth dataset 114y representing a second delimiter space associated with the variable encryption strength of the cryptographic key 101, where the fifth data store 110y is adjacent to the fourth data store 110z and proximal to the central data store portion 120; and (g) a sixth data store 110x having a fourth variable size 112x equal to the second variable size 112c, where the sixth data store 110x is operable to contain a sixth dataset 114x representing a second variable padding space of cryptographic key 101, where the sixth data store 110x is separated from the fourth data store 110z by at least the fifth data store 110y in the plurality of adjacent data stores, and where the fourth variable size 112x is dynamically coupled to the third variable size 112z and inversely related to the variable encryption strength S of the cryptographic key 101.

Thus, in one particular embodiment, and as depicted in FIGS. 1A and 1B, the outcome of the initial CSRNG operation is a produced output that comprises at least three arrays of variable lengths, each containing, for example, 64-bit numbers. In accordance with commonly accepted principles of symmetric cryptography, one part of a cryptographic key array data structure is designated to serve as an initialization vector (IV), while another part is designated to serve as a seed array. A third part serves as variable padding. Unlike conventional symmetric cryptography, a CSRNG process of the present disclosure is used by certain embodiments of the system and methods described herein to additionally generate a padding dataset which is entropy-wise opposing to the IV.

Thus, one general aspect of data structure 100 storing cryptographic key 101 having an encryption strength S comprises a plurality of data stores which includes an encryption key data store (as exemplified, collectively, by first data store 110a and fourth data store 110z), having a size that increases with the encryption strength, and a padding data store (as exemplified, collectively, by third data store 110c and sixth data store 110x), having a size that decreases with the encryption strength S, such that a sum of the size of the encryption key data store and the size of the padding data store is a constant for a range of encryption strengths. Additionally, and as further described below, data structure 100 may further comprise an access control data store operable to store a user-authentication dataset steganographically within (for example and without limitation) the Hyper Key padding (120L and 120R) of cryptographic key 101.

In one embodiment, the outcome of an encryption procedure culminates in the generation of an encryption key of the above-described form, which is subsequently furnished to an operator (i.e., user) of the system described herein. It should be noted, however, that encryption keys can be generated through a variety of methods, as further exemplified below. The present disclosure accommodates alternative embodiments and permits modifications to its various aspects within the bounds of various evident embodiments, without departing from or limiting the scope as set forth herein. Therefore, the illustrations and descriptions provided should be viewed as exemplary in nature rather than restrictive.

Thus, one embodiment constructs an encryption key comprised of multiple parts of entropic material stored in a plurality of adjacent data stores. An original CSRNG data formulation of the cryptographic initialization vector (IV) as well as the seed array are included in the encryption key so that encryption can be reversed as decryption. Additionally, a new series of benign CSRNG is generated at the time of key creation. The benign CSRNG is comingled with real key material (also referred to herein as encryption key data) to establish a significantly larger overall padded key that can be prepared for storage and use by the operator. The amount of benign CSRNG material is dynamic and inversely proportional to a sum (which may be operator-selected) of the initialization vector (IV) length plus the seed array length.

In some embodiments, the size of the entropy-padded key material is limited by an application constant within the cipher that is equivalent to the maximum available key-space (encryption strength S) of the cipher. Real key material and benign padding material are effectively indistinguishable to an unauthorized codebreaker; within the entropy-padded key, they are delineated by dynamically generated delimiters. The delimiter values are integral-type and comprised of, for example, a 64 bit value generated via CSRNG. In this regard, delimiters are also effectively indistinguishable from padding or real key material within the context of the encryption key and potential attack. In addition, and as further described below with respect to FIG. 2D, a penultimate step in constructing a final cryptographic key 101 for distribution involves a recursive XOR operation performed against adjacent numbers in the key (referred to herein as "Zip-Tie"), which may further obfuscate the context of the encryption key.

In some embodiments, and referring to FIG. 1B, delimiters are dynamically generated based on an XOR and bitwise left-shift operation between the left-most and pseudo-random indexes of both the initialization vector (IV) and the seed array, respectively. In the unlikely event (2^128) of a collision in the delimiter value, the collision is detected, and the delimiter is permuted by XORSHIRO-256-star-star stream cipher. In these embodiments, separation of real key material from benign padding in the encryption key requires the inversion of the delimiter algorithm to be applied to the entirety of encryption key material.

In one embodiment, the fully padded encryption key material is further expanded to include an additional 1024 bits of overall key-space CSRNG entropy. In such embodiments, an additional 1280 bits of CSRNG entropy is introduced around the dynamic delimiter 130 of the innermost padding (as shown, Hyper Key padding 120L and 120R).

In one embodiment, and as illustrated in FIG. 1B, the outermost left set of entropy (e.g., 512 bits of CSRNG material stored in Left Outer Pad 105a) is cloned into a temporary vector of values of equivalent length. In one embodiment, the temporary vector is deterministically adjusted via PRGN such that each value in its vector index is permuted along the array index. Permutations are achieved in this embodiment via deterministic 64 bit SplitMax64 PRNG, XOR against a previous index value, and then permuted again second time with SplitMax64 PRNG. The outermost right set of entropy stored in Right Outer Pad 105b is then replaced by the permuted results of the operation applied to the clone of the left set of entropy, and as stored in Left Outer Pad 105a. In this embodiment, the PRNG function serves a dual purpose with relation to the aggregate and overall key material: On one hand, it functions as a flag to determine whether an access control information (also referred to herein as ACL) is steganographically embedded within cryptographic key 101 (as further described below); on the other hand, in the case that no access control information is included, it serves as a key-locking mechanism, in that it provides a minimum additional 1024 bits of entropy to the aggregate overall cryptographic key material.

Creating the Symmetric Key with Steganographically Embedded Access Controls (Hyper Key)

Figure 2A:
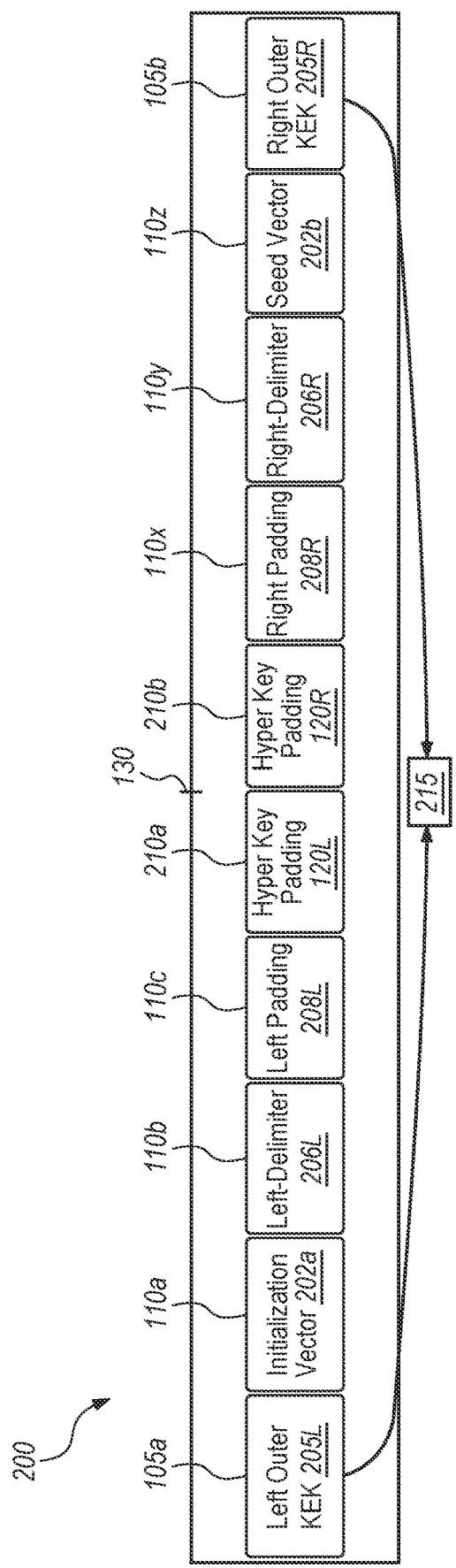
FIGS. 2A, 2B, 2C and 2D collectively illustrate a second embodiment of a data structure for a cryptographic key of the present disclosure.
Figure 2B:
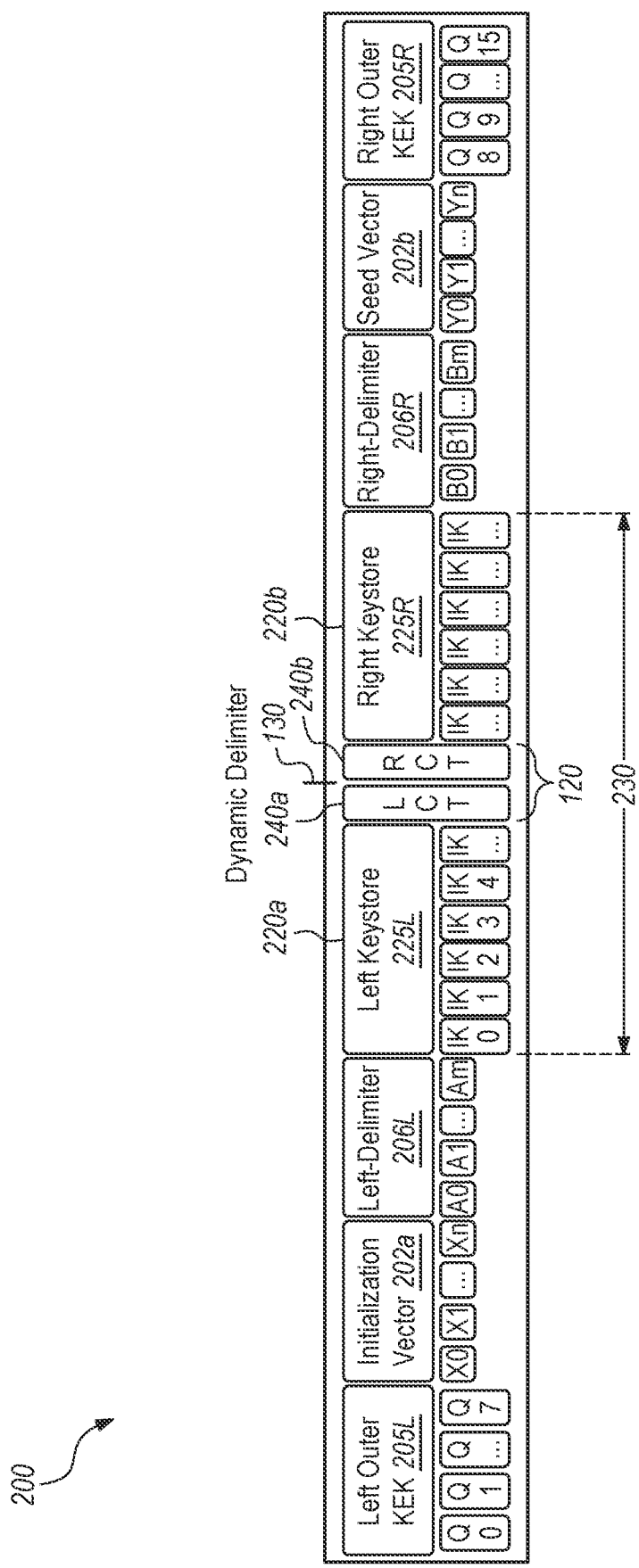
Figure 2C:
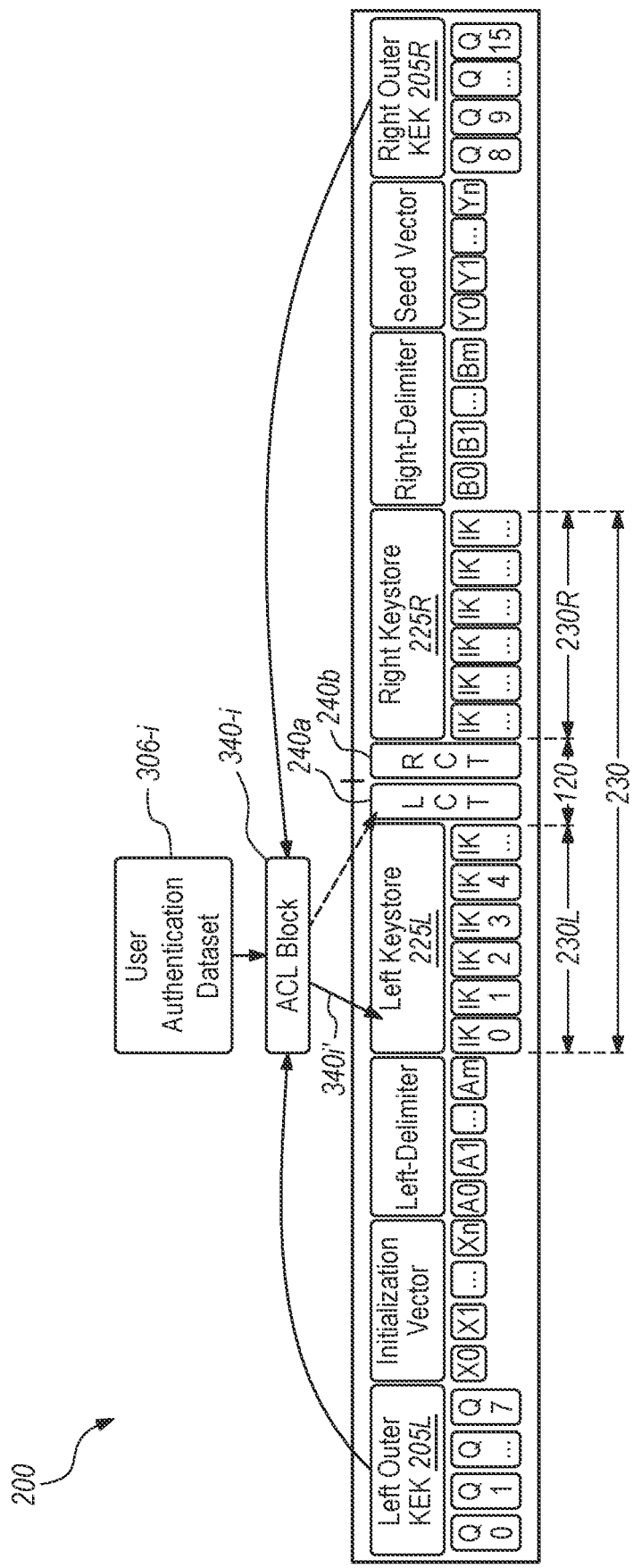

FIGS. 2A, 2B and 2C collectively illustrate a second embodiment of a cryptographic key data structure 200 of the present disclosure, which is also referred to herein as Hyper Key data structure 200. Hyper Key data structure 200 is generally similar to data structure 100, except as explicitly stated. In Hyper Key data structure 200, an access control dataset may be stored in padding section 108 (FIG. 1A), and relates to information used to enable encryption and decryption of a computerized information dataset (a.k.a. "plaintext") using the cryptographic key data structure of the present disclosure. In some embodiments, the access control dataset may include biometric data of a user of the computing device, and/or access control information identifying a portion of the computerized information dataset subject to decryption by the cryptographic key (also referred to herein as "redaction rules"). As described above, the plurality of adjacent data stores may also include a pair of related terminal stores-a first terminal store and a second terminal store-which together collectively contain or define a terminal dataset associated with a key-encryption-key (KEK) dataset, and where the KEK dataset is operable to be used by the computing device to encrypt at least a portion of the access control dataset. In some embodiments, and as further described below, the terminal dataset indicates availability of the access control dataset stored within the third data store. Implementations of the described techniques may include hardware, a method or process, or computer software on a computer-accessible medium.

As illustrated in the embodiment of data structure 200 of FIG. 2A, access control datasets may be incorporated in the data structure for the cryptographic key, where the resulting data structure is referred to herein as a "Hyper Key." In some embodiments, the entirety of the Hyper Key material in aggregate may be expressed as a virtual storage medium and dually purposed key-store enclave. Storage of additional metadata and security ACL-Blocks (described below) within the context of the existing key material of a Hyper Key may be achieved, for example, via steganography, compression, and numeric hiding of integers within other integers using in part, encryption as well as least significant bit (LSB) substitution. Hyper Key embodiments store secure-ACL key configurations that include key-encryption-key information stored steganographically in the otherwise benign padding space at the outer extremity(ies) of the cryptographic key (also referred to herein as "Outer-KEK" material or "terminal stores").

FIG. 2A illustrates one embodiment of a Hyper Key data structure 200 for storing a cryptographic key operable to incorporate access control datasets (also referred to herein as "ACL-Blocks"). Referring to FIG. 2A, in this embodiment, Left Outer-KEK 205L comprises a dataset utilized to construct a key encryption key (KEK). In one embodiment, 512 bits of entropy from Left Outer-KEK 205L is deterministically shifted to generate key encryption key content for Right Outer-KEK 205R. In this embodiment, Hyper Key data structure 200 may be viewed as a converted form of data structure 100 (FIG. 1A), which is repurposed to become a "Hyper Key" cryptographic key comprising a plurality of adjacent data stores operable to store datasets representing (as in the example embodiment shown, without limitation): (a) Left Outer-KEK 205L; (b) an Initialization Vector 202a; (c) a Left-Delimiter 206L; (d) a Left Padding 208L; (e) Hyper Key Padding (two sections, 120L and 120R stored in data stores 210a and 210b, respectively, and straddling dynamic delimiter 130); (f) a Right Padding 208R; (g) a Right-Delimiter 206R; (h) a Seed Vector 202b; and (i) Right Outer-KEK 205R.

In some embodiments, and as shown in the Hyper Key data structure 200 of FIGS. 2A, 2B and 2C, CSRNG padding that separates outermost left and right sets of encryption key entropy (205L and 205R, respectively) comprise specific outer-key-encryption-key (Outer-KEK) material of first terminal store 105a and second terminal store 105b. When an access control dataset is not incorporated into the Hyper Key data structure 200, the Outer-KEK material is treated as benign padding, as in the cryptographic key data structure 100 illustrated in FIGS. 1A and 1B. In some embodiments, KEK material 205L and 205R may be embedded in one or more data stores other than as shown in FIGS. 2A, 2B and 2C which illustrate an exemplary configuration using two terminal stores.

Referring to FIG. 2A, in the embodiment shown, a decryption operation 215 utilizing key material stored within the plurality of adjacent data stores of Hyper Key data structure 200 will remove and inspect the outer-most left and right sections (first and second terminal stores 105a and 105b) of KEK material 205L and 205R, respectively. In the exemplary embodiment shown, if the right-side KEK material 205R equals the permutation of the left side KEK material 205L, the decryption operation will proceed with "Hyper Key" mode (or "ACL" or "ACL Mode") decryption; if the numbers do not align as described, the decryption operation will proceed with "standard" mode decryption in which the inner padding (208L, 120L, 120R, and 208R) is treated as benign padding, as shown in FIG. 1A. In this manner, the dataset collectively stored within the terminal stores indicates availability of ACL material stored within the cryptographic key 101 material. In some embodiments, and as further described below, Hyper Key mode decryption requires an operator's biometric adjunct key material to function correctly; if Hyper Key mode is activated but the required biometric material is not present, the Hyper Key mode decryption function will terminate, and no decryption will occur.

FIG. 2B illustrates further aspects of a Hyper Key data structure 200. As shown in FIG. 2B—and comparing to the data structure 100 of FIGS. 1A and 1B Left, Right, and Hyper Key Padding data stores (110c, 210a, 210b and 110x, respectively) are consolidated to form key-store area 230, including control tabs 240a and 240b at central data store portion 120. In this example embodiment, Hyper Key data structure 200 is operable to store: (a) Left Outer-KEK 205L; (b) Initialization Vector 202a; (c) Left-Delimiter 206L; (d) Left Keystore material 225L; (e) Left Control Tab 240a; (f) Right Control Tab 240b; (g) Right Keystore material 225R; (h) Right-Delimiter 206L; (i) Seed Vector 202b; and (j) Right Outer-KEK 205R.

Functional Aspects of the Hyper Key

In one embodiment, and referring to FIG. 2B, Hyper Key mode decryption begins by isolating the 64 bit long integers immediately to the left and right side of the dynamic delimiter 130, which separates inner padding material of Hyper Key data structure 200. These two numbers are referred to as Control Tabs, LCT 240a and RCT 240b. In one embodiment, the most significant byte (MSB) of the left control tab LCT 240a contains the bitwise representation of the total number of ACL-Blocks placed steganographically within padding to the left of dynamic delimiter 130 (shown in FIG. 2B as Left Keystore data store 220a). The least significant byte (LSB) of the right control tab RCT 240b contains the bitwise representation of the total number of ACL-Blocks placed steganographically within padding to the right of the dynamic delimiter 130 (shown in FIG. 2B as Right Keystore data store 220b). In the embodiment shown, the other bit positions in LCT and RCT, respectively, are used to store the starting indexes of specific ACL-Block material. In this embodiment, benign areas of the CSRNG padding of Left Keystore data store 220a and Right Keystore data store 220b, which are not holding ACL-Blocks or any other key material information, will use PRNG random byte (256) within the bitwise segment of the respective Control Tab.

FIG. 2C illustrates one aspect of the structure and function of an ACL-Block associated with a user i of Hyper Key data structure 200 (depicted at ACL Block 340-i); in particular, FIG. 2C illustrates an example of an access control list (ACL) overlay with a user-authentication dataset 306-i (as a unique credential for user i, such as a multi-factor authentication dataset) in a shared private-key environment. In the embodiment shown, bytes of information in one or more ACL-Blocks comprise Inner-KEK (IK) indexes 230L and 230R, stored in the Left and/or Right Keystores 225L and 225R, respectively. The one or more ACL-Blocks are established as PRNG random sub-selections of data from the Left and Right Outer-KEK (205L and 205R, respectively) by index and established at the time an original ACL-Block 340-i is created by an ACL-Block owner (i.e., a user generating Hyper Key content stored in the Hyper Key data structure 200). Whereas an Outer-KEK 205L and 205R may have, for example, 1024 bits of total CSRNG-based entropy, Inner-KEK indexes 230L and/or 230R would have, for example, 512 bits of total entropy, based on a random selection of, for example, eight 64 bit long integers from the content of Left and/or Right Outer-KEK (205L and 205R, respectively). In other words, Inner-KEK indexes 230L and 230R are randomly generated subsets of content of Left Outer-KEK 205L and Right Outer-KEK 205R. In some embodiments, one predominant feature and purpose of Inner-KEK material stored in Left and/or Right Keystores 225L and 225R (respectively) is to serve as a key encryption key to encrypt Initialization Vector 202a and Seed Vector 202b, which comprise a natural (standard) cryptographic key that may be used for encryption of a single plaintext artifact. In this way, only ACL-Block users who are in possession of a Hyper Key embedding their ACL-Block information can decode access to their own ACL-Block, and thus obtain access to the actual cryptographic key material to be applied to the subject ciphertext for decryption processing.

Referring to FIG. 2C, in one embodiment, generating content for Hyper Key data structure 200 comprises at least the following steps: (a) encrypting at least one access control dataset (ACL-Block 340-i) with Outer-KEK material 205L and/or 205R, plus a user-authentication dataset 306-i (such as, for example, biometric material); (b) insert the encrypted ACL-Block 340-i' randomly in a data store located within the Left Keystore 225L or Right Keystore 225R; and (c) update the data stored within the data stores for control tabs, LCT 240a and RCT 240b, so as to include information regarding the random insertion placement for the ACL-Block 340-i within Hyper Key data structure 200.

Figure 2D:
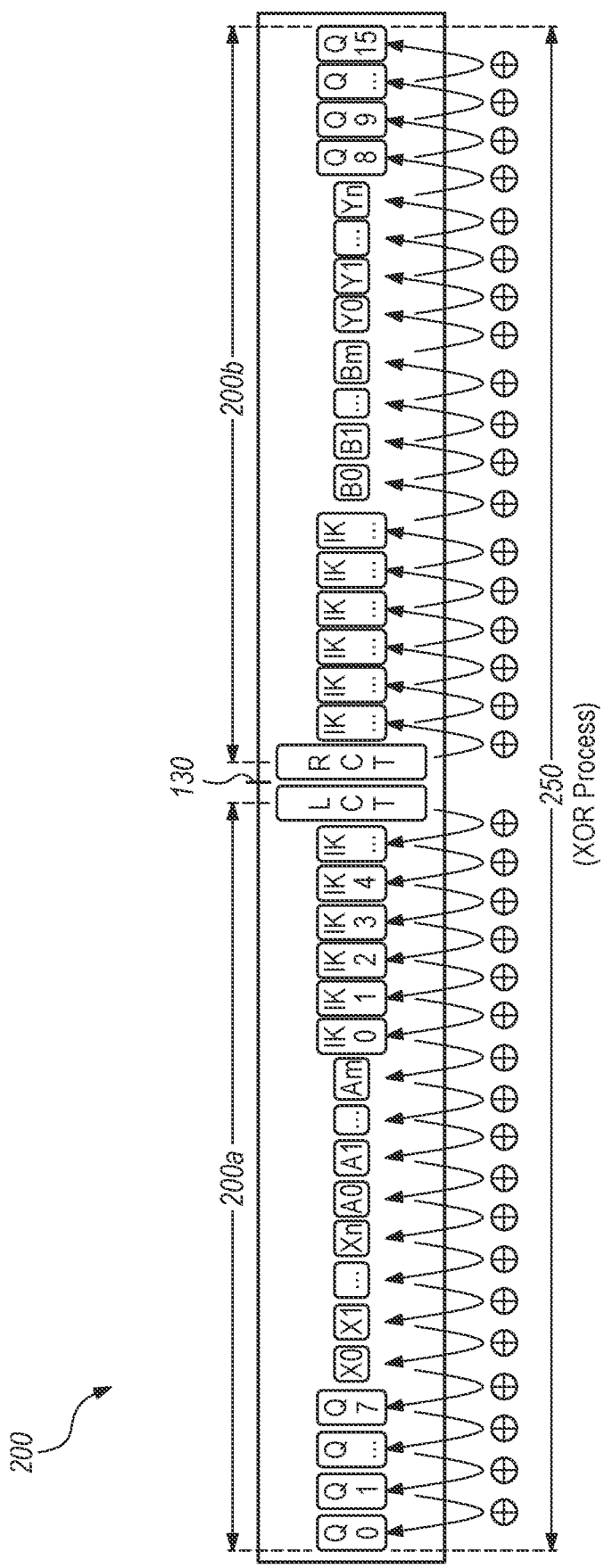

FIG. 2D illustrates one optional embodiment for finalizing content stored in Hyper Key data structure 200 which includes implementation of an additional processing function that serves to further obfuscate key store. In this embodiment, Hyper Key data structure 200 is first fully assembled as shown in FIG. 2C. Referring to FIG. 2D, as the penultimate step prior to key distribution, dynamic delimiter 130 defines a first key portion 200a and a second key portion 200b which, as shown in FIG. 2D, are positioned to the left and right of dynamic delimiter 130, respectively. In the embodiment shown, first key portion 200a and second key portion 200b are subject to a recursive XOR process 250. In the embodiment shown, the recursive XOR process is referred to herein as "Zip-Tie." In the embodiment shown, recursively moving leftward from dynamic delimiter 130, Zip-Tie 250 XOR-adjusts each number to the left with an adjacent number to the right. Conversely, recursively moving rightward from dynamic delimiter 130, Zip-Tie 250 XOR-adjusts each number to the right with an adjacent number to the left. Thus, referring to FIG. 2D, when the key end numbers of Hyper Key data structure 200 are reached, only two numbers of Hyper Key data structure 200 are left unchanged with respect to the penultimate state of the key material in Hyper Key data structure 200.

In this manner, Zip-Tie 250 serves to couple ("tie") all of the numbers stored in Hyper Key data structure 200 together in such a way that each number becomes mutually co-dependent, ordinally. In this way, re-ordering any aspect of Hyper Key data structure 200 or changing any aspect of the overall key-material will result in a non-functional cryptographic key. Zip-Tie 250 thus guarantees the overall congruity of the Hyper Key data structure assembly as a singular cohesive unit. As one of ordinary skill in the art would recognize, applied in reverse, the key-space of Hyper Key data structure 200 must be "un-Zip-Tied" in order to be used. Furthermore, in some embodiments, Zip-Tie 250 may commence at another location along the Hyper Key. In yet other embodiments, Zip-Tie 250 may be applied to cryptographic key data structure 100. In yet other embodiments, Zip-Tie 250 may be applied to any form of cryptographic key.

Figure 3A:
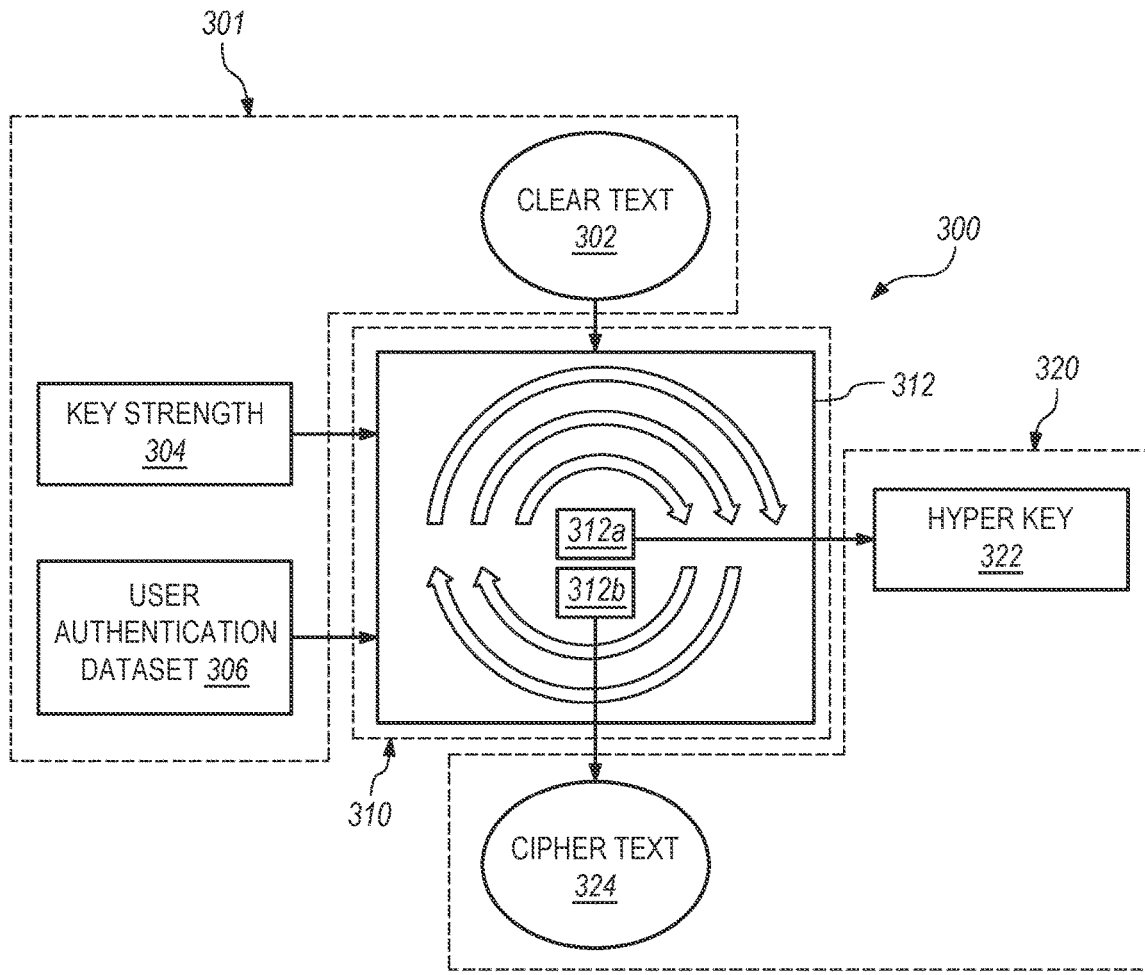
FIGS. 3A, 3B and 3C collectively illustrate one aspect of the present disclosure.
Figure 3B:
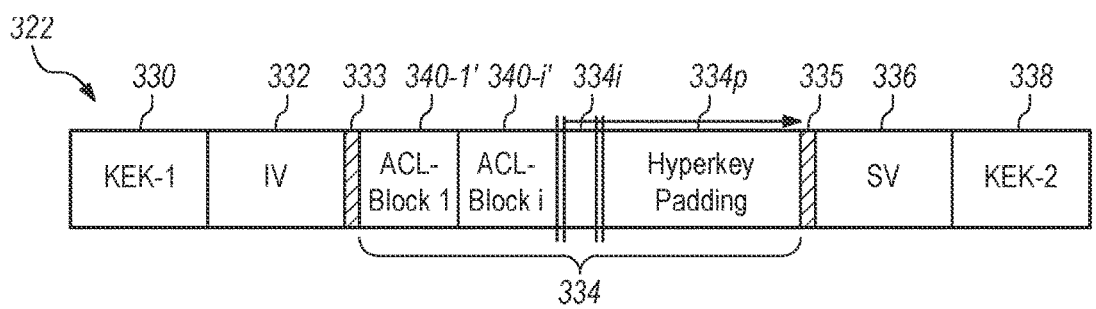
Figure 3C:
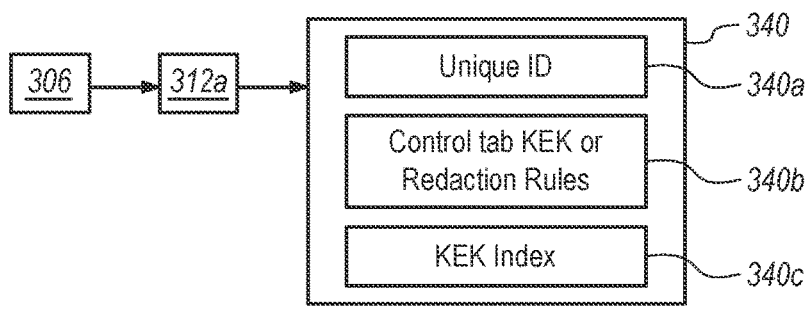

FIGS. 3A, 3B and 3C collectively illustrate a general aspect of the present disclosure concerning the creation of a Hyper Key 322 generated and used by the systems and method disclosed herein. FIG. 3A shows a block diagram depicting input, processing and out aspects of a Hyper Key cryptographic process 312 which includes (1) a key derivation process 312$a$ that generates and uses a Hyper Key 322—which may comprise a Hyper Key data structure 200 as depicted, for example, in FIG. 2C, and (2) an encryption process 312$b$ to encrypt a cleartext data file 302 into a ciphertext output 324.

Referring to FIG. 3A, one general aspect includes a method implemented, for example, in a data processing system 300 having at least one input device 301, at least one computing device 310, and at least one storage device 320. As illustrated in FIG. 3A, one embodiment of the method obtains an encryption key strength 304 and a user-authentication dataset 306 associated with encrypting a cleartext computerized data file 302 (e.g., plaintext data) and subsequently decrypting that encryption. As shown in FIG. 3A, key derivation process 312$a$ defines a cryptographic key data structure of invariant size, Hyper Key 322, which includes an encryption-key data store of variable key-bit space and a padding data store of variable padding-bit space, as described above with respect to FIGS. 1A and 1B, and further described below with respect to FIG. 3B. Using the defined Hyper Key 322, encryption process 312$b$ then converts the computerized data file 302 (containing cleartext) into a ciphertext computerized data file 324 (containing encrypted ciphertext). In the embodiment shown, the user-authentication dataset 306 comprises information obtained, in whole or in part, from the one or more input devices 301 of data processing system 300. Ciphertext 324 and Hyper Key 322 are both then stored in at least one storage device 320 of data processing system 300.

FIG. 3B shows a related block diagram illustrating further structural details of an exemplary embodiment of Hyper Key 322, defined by key derivation process 312$a$ executing on computing device 310. In this example embodiment, defining Hyper Key 322 comprises hydrating it with key material to include: (a) KEK-1 material 330; (b) IV material 332; (c) Left Delimiter padding 333; (d) a central keystore portion 334, comprising key material representing (1) one or more encrypted ACL-Blocks (340-1', ... 340-$i$', ... ), (2) index material 334$i$, and (3) Hyper Key padding 334$p$; (f) Right Delimiter padding 335; (g) Seed Vector material 336; and (h) KEK-2 material 338. (The process of initialization/hydration of Hyper Key 322 with cryptographic key material is further described below with respect to FIG. 9A) As further described below, ACL-Block material includes encrypted access control datasets for one or more users. KEK-1 material 330 is also referred to herein as Left Outer KEK 205L (FIG. 2C); KEK-2 material 338 is also referred to herein as Right Outer-KEK 205R (FIG. 2C).

FIG. 3C is a related block diagram illustrating further structural details of an exemplary ACL-Block 340 of Hyper Key 322 which may be generated by key derivation process 312$a$ and derived in part from user-authentication dataset 306 for a particular user of Hyper Key 322. In one embodiment, ACL-Block 340 associated with user-authentication dataset 306 comprises a unique identifier 340$a$ (derived in part from user-authentication dataset 306 via key derivation process 312$a$), a set of redaction rules 340$b$, and an Outer-KEK index 340$c$. More specifically, in some embodiments, implementations may include one or more particularly unique features of the user-authentication dataset 306 associated with encrypting and decrypting the computerized data files 302 and 324, respectively, such as, for example, biometric data, a multi-factor authentication dataset, and/or an access-control dataset encoding a set of information associated with conditional access to the computerized data file. For example (as and further described below), the user-authentication dataset 306 may include a subset of access-control data encoding redaction information associated with restricted access to a portion of the cleartext computerized data file 302. Such implementations may further include a feature that merges the user-authentication dataset 306 with a data-encryption-key dataset, such as initialization vector material 332 (FIG. 3B), and as further described below. In such embodiments, key derivation process 312$a$ thereby creates a restricted access cryptograph initialization vector dataset relating to the data-encryption-key dataset, and then stores the restricted access cryptograph initialization vector dataset in the cryptographic key data structure.

Figure 4A:
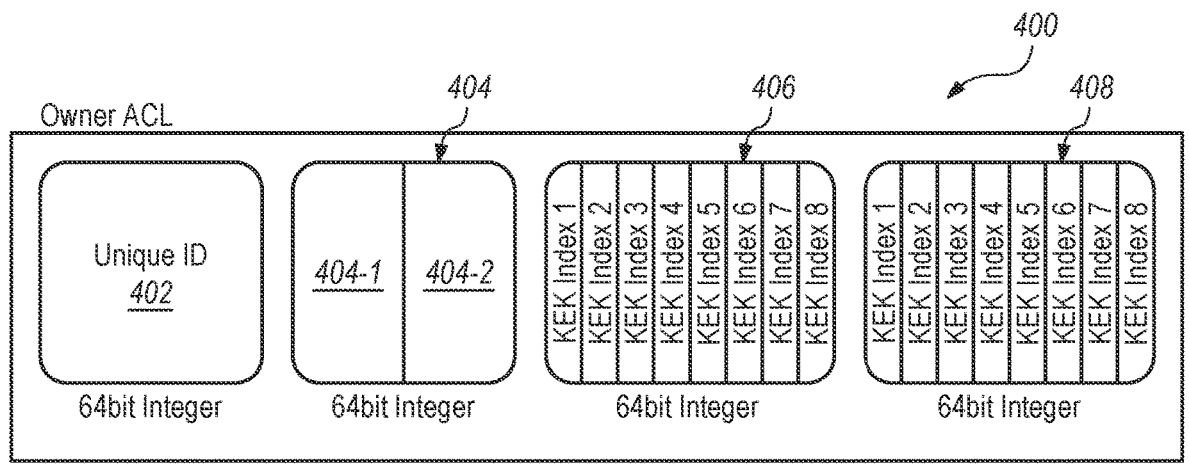
FIGS. 4A and 4B illustrate another aspect of the present disclosure.
Figure 4B:
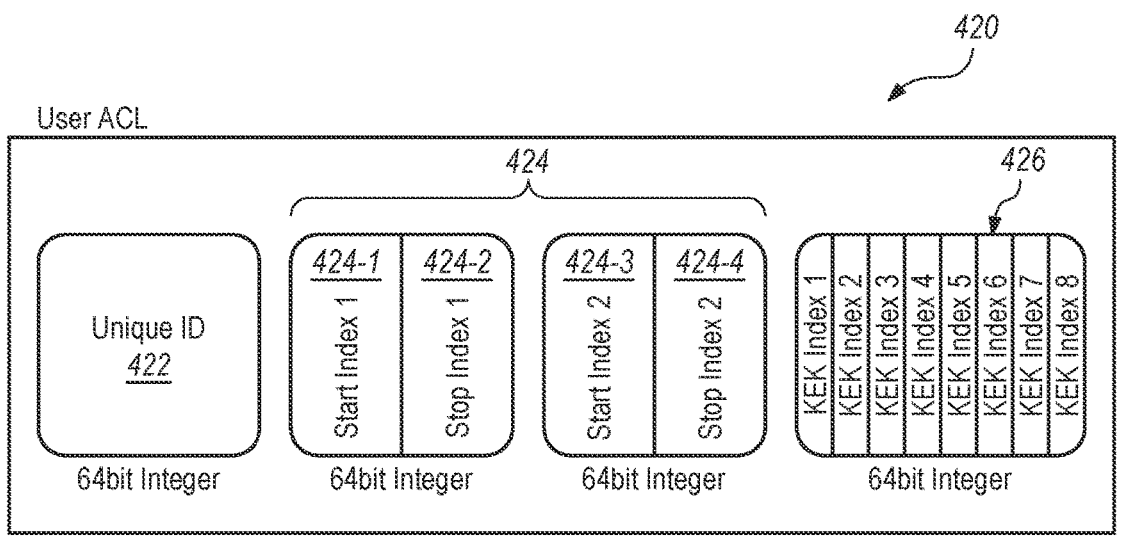

FIGS. 4A and 4B illustrate one exemplary structural embodiment of ACL-Block 340. In the embodiment shown, a user initiating Hyper Key cryptographic process 312 of the present disclosure is considered an "Owner" of cleartext 302 to be encrypted and, as Owner, has unlimited access to ciphertext 324 when in possession of the entirety of the private key material of Hyper Key 322.

FIG. 4A shows an exemplary data structure operable to store an Owner ACL-Block 400, which is constructed by generating a 256 bit storage payload with personalized security constraints set for an individual user level.

Referring to FIG. 4A, and with respect to the general encryption process aspects illustrated in FIG. 3A and in the embodiment shown, an Owner ACL-Block store 400 comprises the following data stores: (a) a unique user identifier (UID) store 402; (b) one or more Owner constant stores 404 (e.g., as shown, 404-1 and 404-2); (c) a first set 406 of key-encryption-key (KEK) Index information stores (e.g., as shown, KEK Index 1 through KEK Index 8); and (d) a second set 408 of key-encryption-key (KEK) Index information stores (e.g., as shown, KEK Index 1 through KEK Index 8). In some embodiments, each of the data stores 402, 404, 406 and 408 comprise a 64-bit integer, although alternative size(s) may be used. In the embodiment shown, first and second sets of KEK Index information, stored in data stores 406 and 408, respectively, and is generated from the Outer-KEK material (e.g., KEK-1 330 and KEK-2 338 as shown in FIG. 3B); however, the first and second sets of KEK Index information are different from each other. KEK Index information stored in data store 406 is used by the Owner to encrypt and decrypt Control Tabs 240a and 240a (see FIG. 2B); KEK Index information stored in data store 408 is used by the Owner to encrypt and decrypt the IV (202a, 332) and the Seed Vector (202b, 336). UID store 402 stores a unique user identification dataset 340a derived from data/information known only to the Owner. Owner constants stored in data stores 404-1 and 404-2 (collectively and/or in combination) allow Hyper Key cryptographic process 312 to recognize that ACL Block 340 is an Owner block-type, in which case, redaction rules 340b permit unrestricted access to ciphertext 324 generated using Hyper Key 322. In the embodiment shown, the eight bitwise indexes (in randomized sort order) of KEK Index 1 through KEK Index 8 (see data store 408) further inform encryption process 312b which aspects of the Outer-KEK material (330 and/or 338) can be considered as Inner-KEK material, where Inner-KEK is used as a key-wrapper for the actual IV 332 and Seed Vector 336 of the a data encryption key used to generate ciphertext 324 from cleartext 302 (and vice versa). (In the embodiments, the seed vector is a seed array dataset.)

Referring to FIG. 4B, in the embodiment shown, a non-Owner user's 256 bit storage payload, User ACL-Block store 420, comprises the following data stores: (a) a unique user identifier (UID) store 422, (b) a set of redaction number stores 424 representing redaction rules 340b for restricting decryption access comprising, for example, (i) a first redaction starting point ("ST1" or "Start Index 1") data store 424-1, a first redaction stopping point ("SP1" or "Stop Index 1") data store 424-2, a second redaction starting point ("ST2" or "Start Index 2") data store 424-3, and a second redaction stopping point ("SP2" or "Stop Index 2") data store 424-4; and (c) eight unique single-byte inner-Key-Encryption-Key (KEK) index data stores 426. In some embodiments, each of the data stores 422 and 426 comprise a 64-bit integer, while data store 424 comprises two 64-bit integers, although alternative size(s) may be used. In this embodiment, unique user ID stored in data store 422 comprises a user identification dataset 340a-i derived from data/information known only to a specific user i who is not an Owner. The set of redaction numbers stored in data store 424 designate starting and stopping points (designated by an Owner when creating Hyper Key 322) for data redaction of cleartext 302—in other words, areas of ciphertext 324 that are not permitted to be decrypted by the user identified by unique UID stored in data store 422. Starting and stopping points can be the same or different. In one embodiment, ST1, SP1, ST2 and SP2 components of redaction rules 340b (stored in data stores 424-1, 424-2, 424-3 and 424-4, respectively) are each 32 bit integers, stored within the center 128 bits of central keystore portion 334. These components allow for Owner-defined data redaction within the scope of decrypted ciphertext. As with the Owner ACL-Block store 400, in this embodiment, the eight bitwise indexes (in randomized sort order) inform encryption process 312b which aspects of the outer-KEK material can be considered as inner-KEK material, where inner-KEK material is used as a key-wrapper for the actual IV and seed array of a data encryption key used to decrypt portions of ciphertext 324 back to unredacted portions of cleartext 302.

Figure 5:
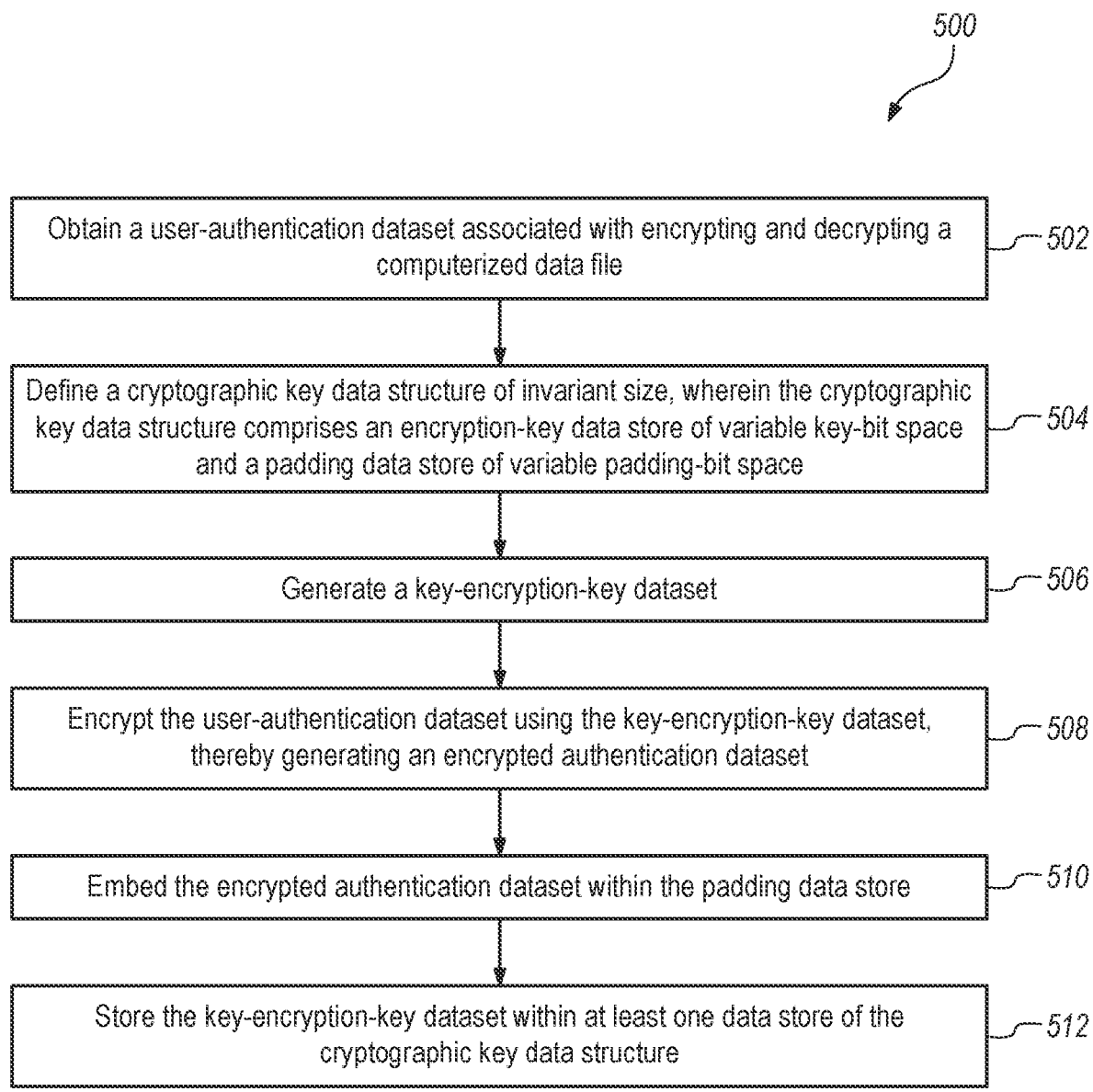
FIG. 5 presents a flowchart for one embodiment of the present disclosure.

FIG. 5 presents a flowchart for one embodiment of the system and methods for implementing a symmetric encryption cipher process 500 with steganographically embedded access controls of the present disclosure. In the embodiment shown, a non-transitory computer-readable program which, when executed on a computing device of a data processing system, causes the computing device to perform the following process steps: (a) obtaining a user-authentication dataset associated with encrypting and decrypting a computerized data file (Step 502); (b) defining a cryptographic key data structure of invariant size, where the cryptographic key data structure comprises an encryption-key data store of variable key-bit space and a padding data store of variable padding-bit space (Step 504); (c) generating a key-encryption-key dataset (Step 506); (d) encrypting the user-authentication dataset using the key-encryption-key dataset, thereby generating an encrypted authentication dataset (Step 508); (e) embedding the encrypted authentication dataset within the padding data store of variable padding space (Step 510); and (f) storing the key-encryption-key dataset within at least one data store of the cryptographic key data structure (Step 512).

Implementations may also include one or more particularly unique features of the user-authentication dataset associated with encrypting and decrypting the computerized data file, such as, for example: (1) biometric data of a user of the data processing system; (2) a multi-factor authentication dataset; (3) an access-control dataset encoding a set of information associated with conditional access to the computerized data file, for example, by including a subset of access-control data encoding redaction information associated with restricted access to a portion of the computerized data file. Such implementations may further include a feature that merges the user-authentication dataset with a data-encryption-key dataset, thereby creating a restricted access, cryptograph initialization vector dataset relating to the data-encryption-key dataset, and then stores the restricted access cryptograph initialization vector dataset in the cryptographic key data structure. Implementations of the described techniques may include hardware, a method or process, or computer software on a computer-accessible medium.

Figure 6A:
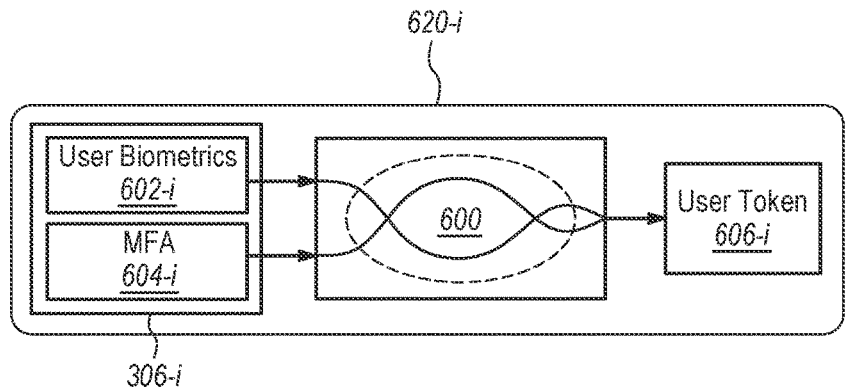
FIGS. 6A and 6B collectively illustrate aspects of one embodiment of the present disclosure.
Figure 6B:
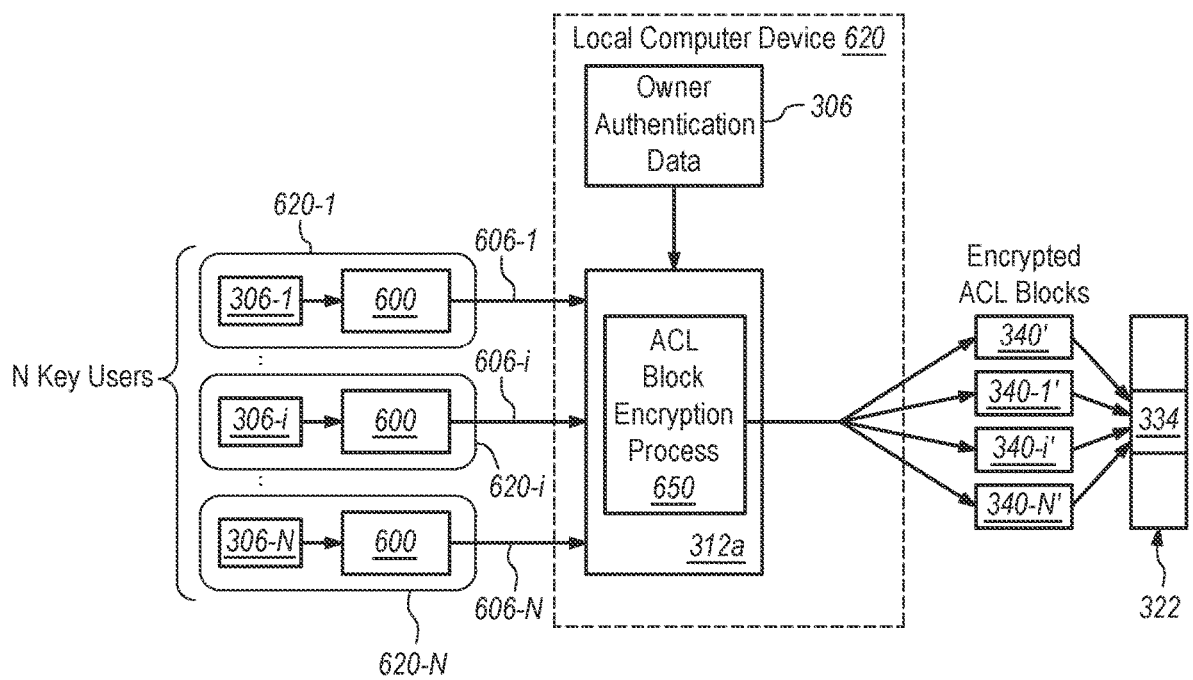

FIGS. 6A and 6B illustrate further details of an embodiment defining ACL aspects of Hyper Key 322 depicted in FIG. 3A—in particular, central keystore portion 334—and the method depicted in the flowchart of FIG. 5. Whereas FIGS. 3A, 3B and 3C collectively illustrate a general aspect of the present disclosure which concerns the creation of a Hyper Key 322 by an Owner, and associated Owner ACL-Block material, FIGS. 6A and 6B depict further details for incorporating non-Owner user-authentication datasets into the central keystore portion 334 of Hyper Key 322.

Referring to FIG. 6A, in the embodiment shown, each user-authentication dataset 306-i in a plurality of user-authentication datasets (306, 306-1, 306-2, . . . , 306-i, . . . , 306-N) comprises user biometric data 602-i and/or a multi-factor authentication dataset 604-i. FIG. 6A illustrates one example embodiment of a token generator process 600, which constructs the unique UID component 340a of ACL-Block 340-i (see FIG. 3C) derived from the user-authentication dataset 306-i. Token generator process 600 comprises computerized program code executing on a user's local computer device 620-i in association with creating one or more ACL-Blocks 340-i to be incorporated in defining Hyper Key 322. In some embodiments, token generator process 600 is operable to combine user biometric material 602-i with other user multi-factor authentication information 604-i, which may be derived, for example, by permuting a 128 bit unique UID of an operator's unique product license key ID. In some embodiments, a product license key ID (LKID) is used to verify a user before an ACL-Block 340-*i* can be created. In some embodiments, as a preliminary step for preventing Owner's ability to reverse the user's LKID, the LKID is subjected to a one-directional hashing function, which, in some embodiments, is SHA-512. In some embodiments, given a valid LKID, the unique UID is broken into two 64 bit long values whereby the first value uses the unique UID's most significant bits, and the second value uses the unique UID's least significant bits; the high and low values are subsequently XOR against each other and stored as a single byte array, token 606-*i*. In some embodiments, token 606-*i* is then fully encrypted on a user's local computer device 620-*i* by token generator process 600, for example, by using a nested call to a streaming encryption process in header-less mode with multi-factor authentication (MFA), using a 10,240 bit static "Hyper-KEK" (an application constant) and the user's biometric material 602-*i*; the resulting ciphertext token is then reduced to a single 64 bit long integer using SplitMax64 PRNG, rotated and adjusted for hamming weights, and stored in the ACL-Block 340-*i* as unique user ID 340*a*-*i*. This process prevents the Owner from having access to the user's LKID.

Referring now to FIG. 6B, the Owner generates a user's ACL-Block 340-*i*, as, for example, in the form described above with respect to FIG. 4B. In such embodiments, ACL Block 340-*i* is created by key derivation process 312*a* with four [4]64 bit numbers comprising 256 bits of data storage. The first 64 bit number space ("segment") comprises the user's obfuscated irreversible UID obtained as the derivative of the user's LKID. In the embodiment shown (and referring back to FIG. 4B), segment 424 of the ACL Block 420 is comprised of four [4]32 bit numbers indicating the start1, stop1, and start2, stop2 positions of redaction as manually designated or selected by the owner; a final segment 426 comprising the last 64 bit number space is a copy of the owner's KEK indexes in the form of eight [8]single-byte integers.

Referring to FIG. 6B, in some embodiments, a 256 bit ACL-Block 340-*i* is encrypted via encryption process 650 using the Left and Right Outer-KEK materials (see FIG. 3B, 330 and 338, respectively) as a primary key-encryption-key in combination with a user's biometric material 602-*i* and/or multi-factor authentication information 604-*i* included in user-authentication dataset 306-*i*. In such embodiments, and referring back to FIG. 3B, the Owner is the only user who can add or remove ACL-Blocks (representing other users) to the central keystore portion 334 of Hyper Key 322. Further, a user i trying to decrypt a ciphertext 324 with Hyper Key 322 must present their own MFA material and/or biometric data at the time of action, and is only able to decode their own ACL-Block from the Hyper Key 322 payload. In this context, a Hyper Key payload is distinguished from Hyper Key entropy (padding), as and when the content of the KeyStore (FIG. 2C) is transformed into usable/identifiable material, as opposed to simply randomness or padding (FIGS. 1A and 1B).

In some embodiments, an Owner may subsequently add, remove, or update another user's ACL-Block (340-*i*) within key-store 334. The number of users which can be added to the key-store 334 depends on the available bytes within the overall available Hyper Key space 334-*p* (shown in FIG. 3B) and is further entropically constrained. In some embodiments, this feature gates the maximum number of ACL-Blocks steganographically placed within the CSRNG medium at an upper bound, (for example, 14). The lower bound is gated by the total amount of available dynamic padding within the key entropy of key-store 334; for example, in some embodiments, encryption with the highest bit-strength of 10,240 bits will allow a maximum of four possible ACL-Blocks, since there is less available dynamic padding in the key at higher bit-strength.

Merging Biometric Data with Cryptographic Key Material

Another general aspect of the system and methods of the present disclosure includes a method, for example, as embodied in a non-transitory computer-readable program, performed or executed on a computing device, to obtain a user-authentication dataset and merge the user-authentication dataset with cryptographic key material, such as, for example, an initialization vector dataset, thereby producing a data encryption key (DEK) derived from the user-authentication dataset. Such embodiment is then operable to store the DEK in a cryptographic key data store for later use in a symmetric cipher. Embodiments of this aspect include corresponding computer system(s), device(s), apparatus, and computer program(s) recorded on one or more computer storage devices, configured to perform the actions of the methods. Such implementations may include a non-transitory computer-readable program where the user-authentication dataset includes biometric data and/or where a non-transitory computer-readable program, when executed on the computing device of the data processing system, further causes the computing device to encrypt at least a portion of the user-authentication dataset, thereby creating an encrypted authentication dataset, and then store the encrypted authentication dataset in the cryptographic key data store. Implementations of the described techniques may include hardware, a method or process, or computer software on a computer-accessible medium.

Figure 7:
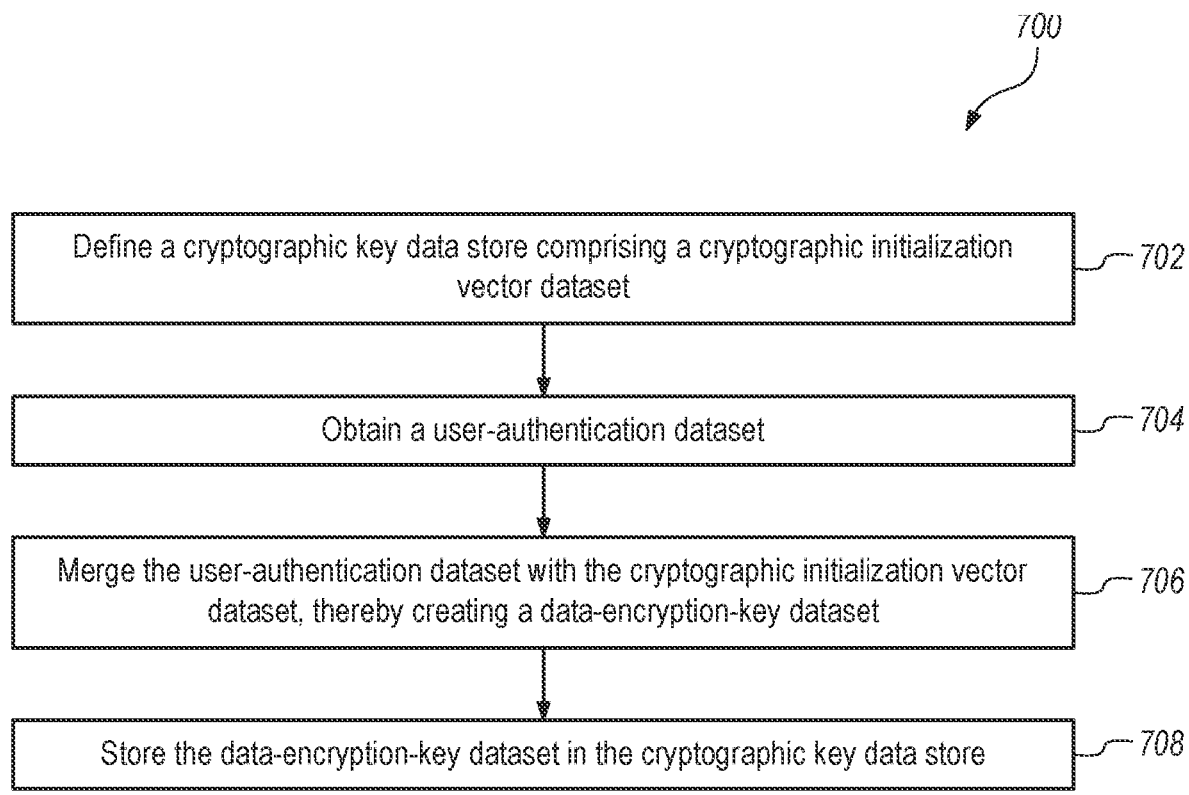
FIG. 7 presents a flowchart for yet another embodiment of the present disclosure.

FIG. 7 presents a flowchart for one such exemplary data encryption key process 700 of the present disclosure. In this embodiment, a non-transitory computer-readable program which, when executed on a computing device of a data processing system, causes the computing device to perform the following steps: (a) defining a cryptographic key data store, where the cryptographic key data store comprises a cryptographic initialization vector dataset (Step 702); (b) obtaining a user-authentication dataset (Step (704); (c) merging the user-authentication dataset with the cryptographic initialization vector dataset, thereby creating a data-encryption-key dataset (Step 706); and (d) storing the data-encryption-key dataset in the cryptographic key data store.

Figure 8A:
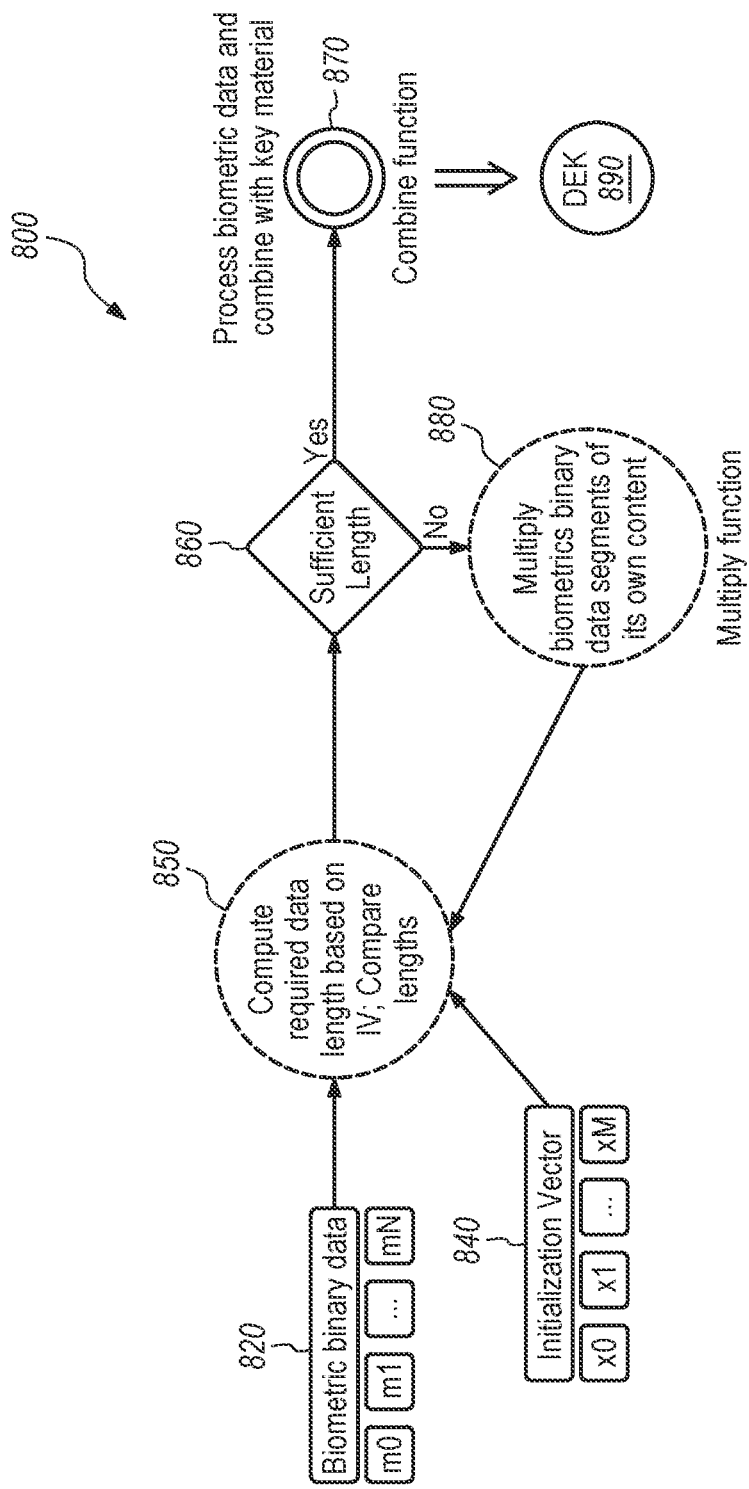
FIGS. 8A and 8B collectively illustrate one embodiment of an aspect of the present disclosure which is generally depicted in the flowchart of FIG. 7.
Figure 8B:
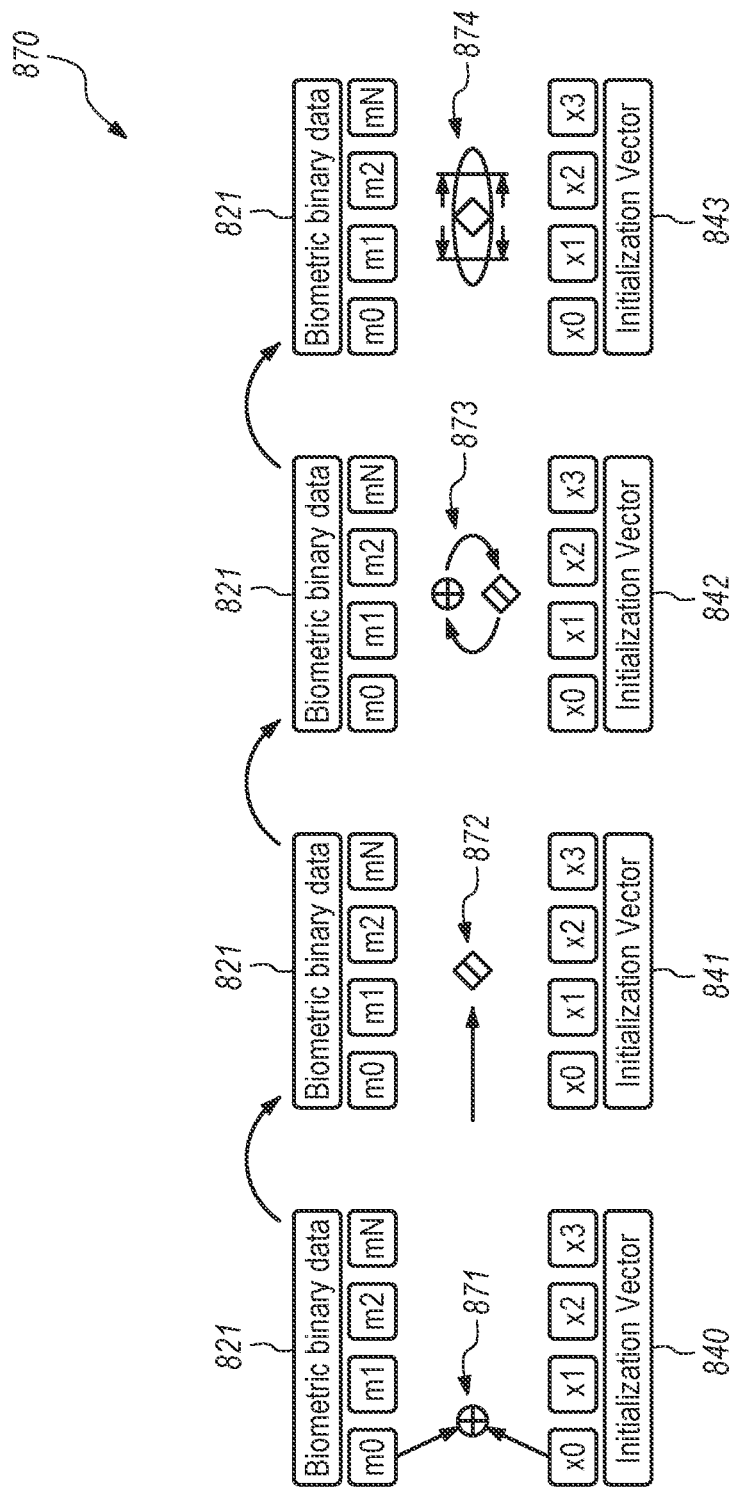

FIGS. 8A and 8B depict further details of one embodiment of an encryption key initialization process 800 for obtaining cryptographic key material, which may be used at Step 706 (FIG. 7) to merge a user-authentication dataset 820 (e.g., a biometric dataset) with cryptographic initialization vector dataset 840, thereby creating a data-encryption-key (DEK) dataset 890. In some embodiments, a combination of biometric data with streaming encryption to generate multi-factor authentication (MFA) key material may be accomplished with this process. The size of user-authentication dataset 820 may vary compared to the initialization vector dataset 840. In some embodiments, when user-authentication dataset 820 is smaller than IV dataset 840 (or a seed array) it can be stretched dynamically to conform to a length offset of the corresponding initialization vector dataset 840.

Thus, FIG. 8A illustrates an example data encryption key initialization process 800 by which a user-authentication dataset 820 comprising biometric data may be boosted in size, to ensure that multi-factor authentication (MFA) entropy is of sufficient length to blend with symmetric encryption key material represented by cryptographic initialization vector 840. Referring to FIG. 8A, in the embodiment shown, user-authentication dataset 820 comprises biometric binary data, which is input into process 850 along with cryptographic initialization vector 840. Process 850 computes a required data length N for user-authentication dataset 820 based on the size M of cryptographic initialization vector 840 (or otherwise compares length N to size M). A comparison process 860 then determines if the required data length N is met by user-authentication dataset 820; if so, then process 870 combines (merges) user-authentication dataset 820 with key material of the cryptographic initialization vector 840, so as to produce a data-encryption-key (DEK) 890; if not, then process 880 alternatively multiplies (i.e., duplicates) segments of user-authentication dataset 820 (in this example, biometric binary data segments) of its own content, and sends the result back to process 850 for another comparison check against sufficient length determination.

In one embodiment, an output of data encryption key initialization process 800 described above is a variable-length array of 64 bit integers which is the result of combining (merging) the permuted CSRNG values of cryptographic initialization vector 840 with XOR biometric data. This dynamically-generated, variable-length array may later be used to allow for decryption of ciphertext. One example of this array is DEK 890.

FIG. 8B depicts further details of one example embodiment of process 870, introduced above and shown in FIG. 8A, where the user-authentication dataset 820 comprises biometric binary data. Referring to FIG. 8B, integration of a biometric dataset 821 will result in the execution of XOR between the biometric binary values (m0, m1, ..., mN) and the numeric values present in the initialization vector 840 and its intermediate states 841, 842, and 843 (and/or seed array (not shown)), utilized for encryption. In the exemplary embodiment shown, process 870 merges biometric binary data with symmetric key material—initialization vector 840—of the cryptographic key of the present disclosure; such data is thus blended together and balanced for Hamming weights. Referring to FIG. 8B, in the embodiment shown, process 870 comprises four steps: (a) at step 871, each byte of biometric dataset 821 is XOR against each byte of symmetric key material (IV dataset 840); (b) at step 872, and for each XOR byte, apply Spin-Shift PRNG XOR-SHIRO_256; (c) at step 873, XOR each spin shift byte against the original biometric byte; and (d) at step 874, and for each shifted byte apply normalized Hamming-Weight adjustment to widen or contract. The exemplary embodiment of FIG. 8B** may be used, for example, in a streaming cryptosystem blending MFA authentication bits with cryptographically secure entropy as a salted data encryption key.

Example Initialization of a Data Encryption Key (DEK)

In various embodiments, a sequence of linear congruential generators (LCGs) is employed to shuffle repeatedly individual outputs of the data encryption key material (DEK 890) utilizing deterministic PRNG methods. Example LCGs that may be used include (but are not limited to) "Linear Congruential Generator (LCG)/Deterministic Random Number Generator (RNG) Implementation based on Xoroshiro256**" by David Blackman and Sebastiano Vigna, "Permuted Congruential Generator (PCG)/Simple Fast Space-Efficient RNG by Melissa O'Neill. Counter-rotational PRNG generators are coordinated with a Linear-Feedback Shift Register (LFSR) to accomplish non-linear mathematical modifications to the preliminary initialization vector and seed array. The resulting combination of PRNG methods is a Non-Linear-Feedback Shift Register (NLFSR) that permutes numbers with an a priori high period, low collisions, and proportionally low hamming weights, as measured by a SMT solver and tests for period, numeric bias, and collisions.

In some embodiments, a preliminary initialization process utilizes a Fisher Yates Shuffle (FYS) to establish a cryptographic substitution box (S-BOX). The S-BOX is initialized through the incorporation of dynamic variables derived from a non-linear feedback shift register (NLFSR) stream. This S-BOX initialization technique is based on a modified form of modular multiplication, generating a key-dependent deterministic S-BOX that is distinct from the permuted state of the initialization vector (IV) and seed array.

In such embodiments, during the preliminary initialization process, a secondary Non-Linear Feedback Shift Register (designated as NLFSR2) is established through the utilization of an ensemble of linear congruential generators, initialized with a duplicate of the original initialization vector (IV). NLFSR2 is employed in conjunction with an independent Fisher Yates Shuffle (FYS) process, resulting in the generation of a supplementary substitution box (S-BOX2) that is populated with multiplicative elements that possess mathematical dissimilarity to those produced by the primordial NLFSR.

Once the preliminary initialization process is complete, a cryptographic procedure commences in which the original data, referred to as plaintext or clear-text, undergoes a series of intricate obfuscation steps. Such cryptographic procedure may include, for example: for each segment of clear-text (binary) input, a new and dynamic block of entropy, incorporating integral-type randomness of equal byte-length, is generated. Creation of entropy is achieved through, for example, the alternating utilization and bivalent advancement of the Non-Linear Feedback Shift Register (NLFSR) and the Non-Linear Feedback Shift Register 2 (NLFSR2) (described above) in accordance with the XOR of the current state of the encryption key.

Figure 9A:
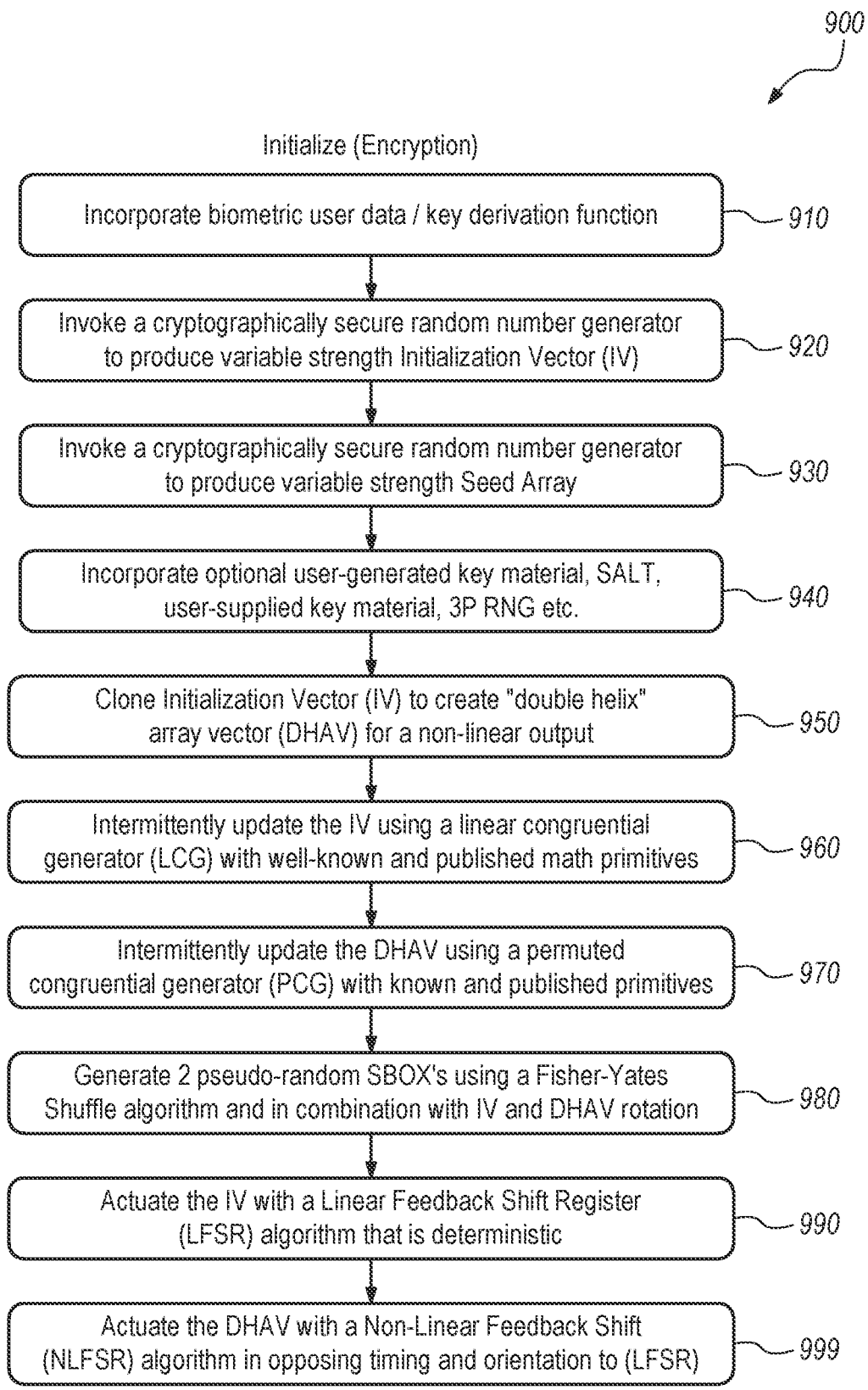
FIGS. 9A and 9B present related flowcharts for one embodiment of the present disclosure.
Figure 9B:
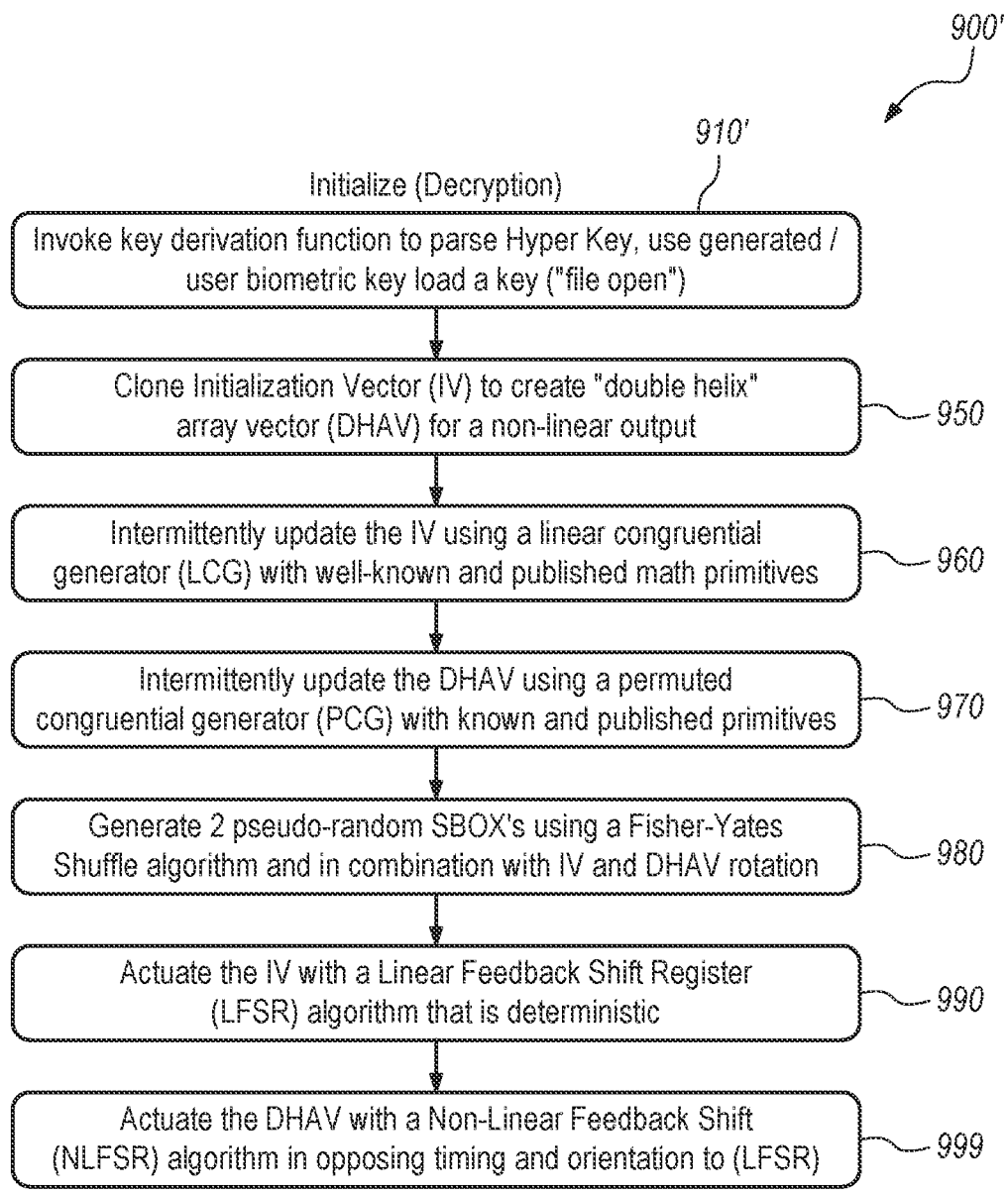

FIGS. 9A and 9B present related flowcharts for encryption/decryption initialization for one embodiment of the present disclosure. Referring to FIG. 9A, in the embodiment shown, data encryption key material is initialized by an encryption initialization process 900 using the following steps. In this embodiment, Step 910 optionally incorporates biometric user data with key derivation process 312a described above. In Step 920, encryption initialization process 900 invokes a cryptographically secure random number generator to produce a variable strength initialization vector (IV). In Step 930, encryption initialization process 900 invokes a cryptographically secure random number generator to produce variable strength seed array. Instead of, or in addition to random number generators to produce the IV and seed array, an alternative or optional Step 940 incorporates optional user-generated key material, SALT, or user-supplied key material, or additional external or third-party plug-and-play random number generator. In Step 950, encryption initialization process 900 clones the initialization vector (IV) to create a structure in the form of a double helix vector (DHV) for a non-linear output. The term "double helix," in this context, refers to a virtual data structure that (when used in application) synthesizes the directional shape wherein two identical vectors represent outer "bars" of a double helix shape. At a subsequent step during the encryption/decryption processes, these bars are bent inward and pull data from each side intermittently, in such a way that a double helix can be visualized. In Step 960, encryption initialization process 900 intermittently updates the IV using a linear congruential generator (LCG) with math primitives such as, for example include (but are not limited to) "Linear Congruential Generator (LCG)/Deterministic Random Number Generator (RNG) Implementation based on Xoroshiro256," by David Blackman and Sebastiano Vigna. In Step 970, encryption initialization process 900 intermittently updates the DHV using a permuted congruential generator (PCG) with primitives that may include, for example; "Permuted Congruential Generator (PCG)/Simple Fast Space-Efficient RNG by Melissa O'Neill. In Step 980, encryption initialization process 900 generates two pseudorandom S-BOX's using a Fisher-Yates Shuffle algorithm and in combination with IV and DHV rotation. In Step 990, encryption initialization process 900 actuates the IV with a Linear Feedback Shift Register (LFSR) algorithm that is deterministic. At Step 999, encryption initialization process 900 actuates the DHV with a Non-Linear Feedback Shift (NLFSR) algorithm in opposing timing and orientation to (LFSR). Thus, in the embodiment depicted in FIG. 9A, the inputs to encryption initialization process 900** include either a user-specified strength setting which uses RNG to produce the corresponding strength, (described as System Generated Key SGK), or user defined entropy in the form of a password/SALT, (described as a User Generated Key UGK).

FIG. 9B further depicts a related decryption initialization process 900' which is operable in the case of decryption. In the embodiment shown, rather than performing Steps 910-940 and for encryption initialization process 900, decryption initialization process 900' begins with a fully formatted encryption key (as defined above with respect to cryptographic key data structures 100, 200, and/or 322) that contains all precursors created previously by encryption initialization process 900 at Steps 910-940. Thus, instead of performing Steps 910, 920, 930 and 940, decryption initialization process 900' begins at Step 910', which invokes an inverse key derivation process to parse the encryption key to obtain the IV stored within. Successive Steps 950 through 999 for encryption initialization process 900 and decryption initialization 900' are otherwise the same.

The outputs of encryption initialization process 900 and decryption initialization process 900' include fully initialized cryptographic key material that is loaded in memory, primed, and ready to perform the encipherment or decipherment of data, respectively. Use of these various outputs is further described below.

Example Encryption Using the Data Encryption Key (DEK)

Figure 10:
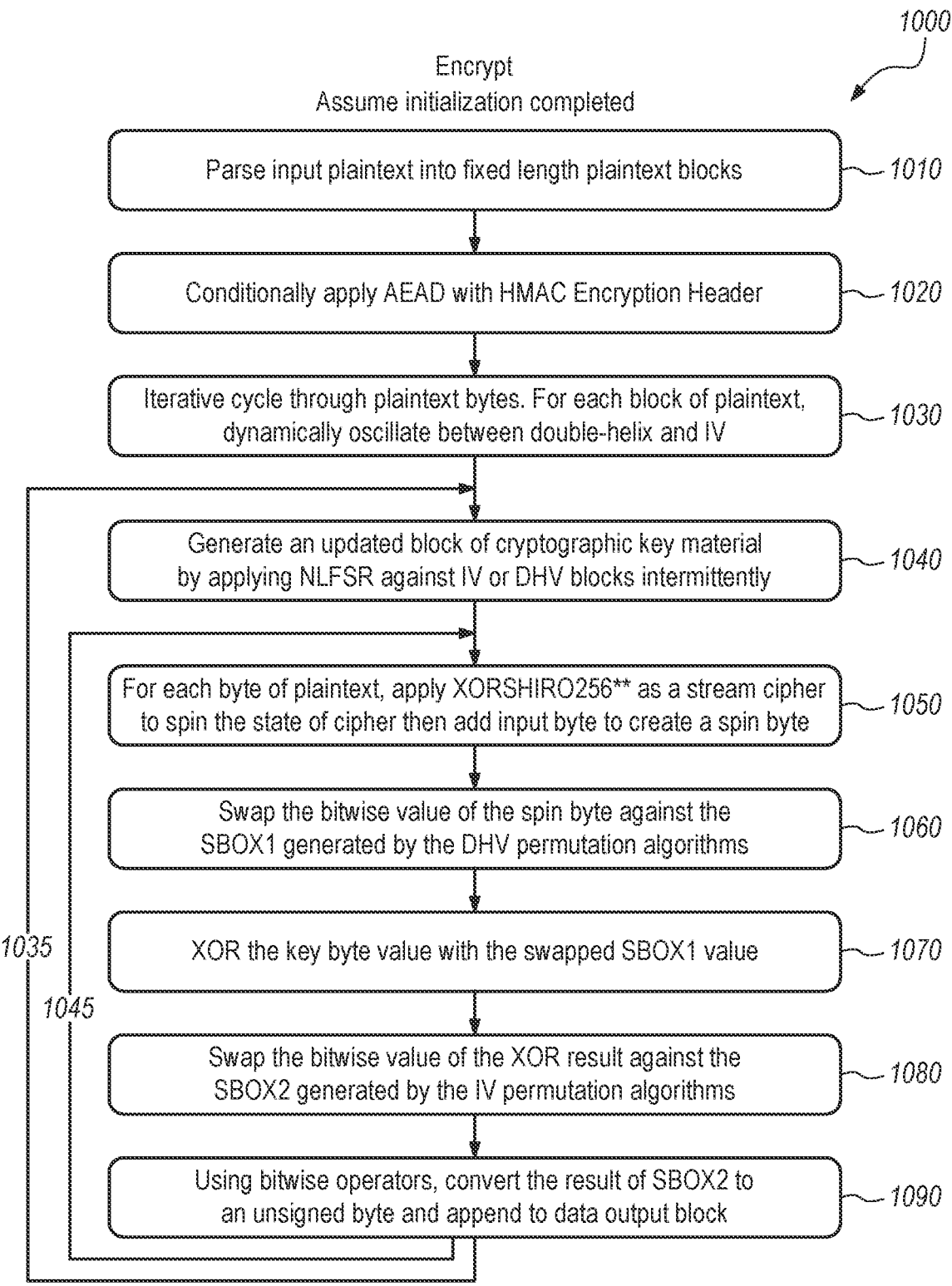
FIG. 10 presents a flowchart for another aspect for one embodiment of the present disclosure.

FIG. 10 presents a flowchart for another aspect for one embodiment of the present disclosure. In this embodiment, an encryption process 1000 commences once initialization process 900 is complete. Thus, the final output of encryption initialization process 900 is an input to encryption process 1000. Referring to the embodiment of FIG. 10, an exemplary encryption process 1000 performs the following steps. At Step 1010, encryption process 1000 parses input plaintext (a.k.a. clear-text) into fixed length plaintext blocks. At Step 1020, encryption process 1000 conditionally applies authenticated encryption with associated data (AEAD) with HMAC (hash-based method authentication codes) in the ciphertext header. In Step 1030 through Step 1090, encryption process 1000 iteratively cycles through plaintext data bytes in an outer processing loop 1035 that includes Steps 1040-1090; in the embodiment shown, for each block of plaintext, encryption process 1000 dynamically oscillates between double-helix DHV and IV. At Step 1040, encryption process 1000 generates an updated block of cryptographic key material by applying NLFSR against IV or DHV blocks intermittently. At Step 1050, and for each byte of plaintext, an inner processing loop 1045 that includes Steps 1050-1090 is performed. Thus, at Step 1050, encryption process 1000 applies XORSHIRO256 as a stream cipher to spin the state of cipher then adds the input byte, thereby generating a spin byte. At Step 1060, encryption process 1000 swaps the bitwise value of the spin byte against S-BOX1 generated by the DHV permutation algorithm(s) (LCG and PCG algorithms, described above). At Step 1070, encryption process 1000 performs an XOR of the key byte value with the swapped S-BOX1 value. At Step 1080, encryption process 1000 swaps the bitwise value of the XOR result of Step 1070 against the S-BOX2 generated by the IV permutation algorithms. At Step 1090, using bitwise operators, encryption process 1000 converts the result of S-BOX2 to an unsigned byte and appends it to a data output block of ciphertext. In some embodiments, encryption process 1000 conditionally swaps the result of Step 1050 with AES-128-CTR when run in FIPS 140-2** compliance modes of operation.

Thus, in one embodiment, the internal memory state of DEK 890 is permuted via the application of the XOR-SHIRO-256 stream cipher for each byte of input plaintext. DEK 890** is then rotated using a SplitMax64 algorithm to ensure evenly distributed 64bit hamming weights for each updated value and position on the array index. Each input byte is subsequently rotated leftward by several degrees, masked and, using a bit-wise operator, then added to the value of the input byte. At this step of the embodiment, the input byte is down-sampled into a 32bit integer and stored temporarily as an output byte. Such rotational update has the characteristics and properties of a stream cipher.

In this embodiment, upon establishing an output byte, the output byte is then converted into a real number by dropping its sign. After the sign has been dropped, the output byte is swapped for a value in S-BOX2 using an array index position of the least significant byte of the output byte, derived via bitwise AND operation with hexadecimal 255. This substitutional swap based on a dynamic value of the output byte is characteristic of a block cipher. Whereas the core functionality of the XOR mechanism is based upon the computational theory and practical implementation of a Stream cipher, the use of multiple S-BOX within the system and method described herein results in a hybrid Stream/Block cipher characteristic.

In this example, after swapping the output byte for a dynamic value within the S-BOX2, the output byte is XOR against the next bit of entropy in the established BLOCK at the same array index position as the input byte. This XOR operation has the fundamental characteristic of a stream cipher and is a component of one aspect of the cryptographic function of the exemplary embodiment.

Finally, in this example, the XOR value of the output byte is subsequently swapped for a value in S-BOX1 using the array index position of the least significant byte of the updated output byte, derived via bitwise AND operation with the hexadecimal 255. This substitutional swap based on the dynamic value of the output byte is characteristic of a block cipher. At this stage, the transformed output byte is considered ciphertext.

Figure 11:
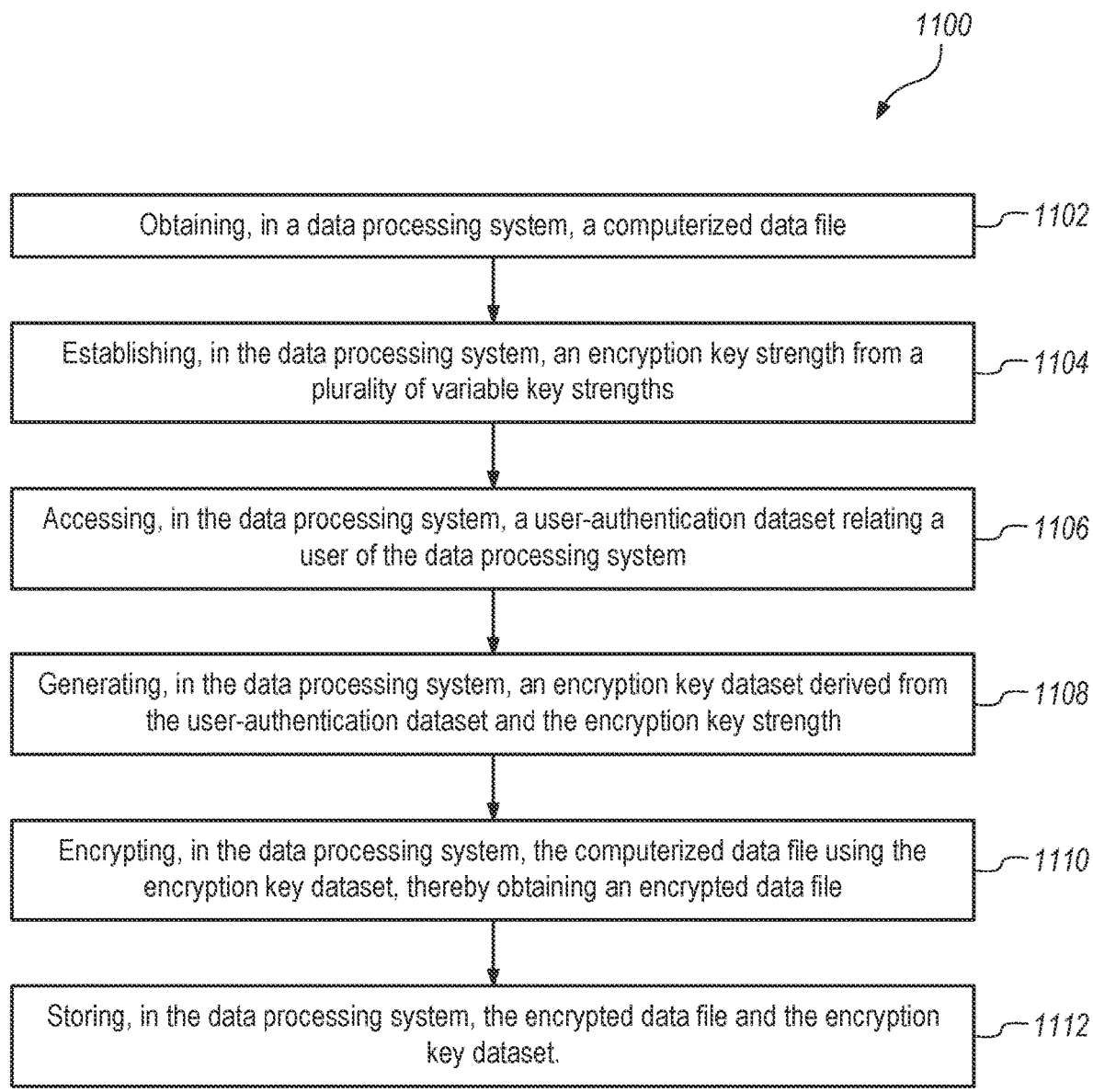
FIG. 11 presents a flowchart for yet another aspect for one embodiment of an encryption process of the present disclosure.

FIG. 11 presents a higher-level flowchart for describing one general aspect for embodiments of the encryption process of present disclosure. Referring to FIG. 11, in some embodiments, a more general aspect of the system and methods of the symmetric cipher disclosed herein includes a non-transitory computer-readable program which, when executing on a computing device, causes the computing device of a data processing system to perform an encryption process 1100 executing the following steps. At Step 1102, encryption process 1100 obtains a computerized data file. At Step 1104, encryption process 1100 establishes an encryption key strength from a plurality of variable key strengths. At Step 1106, encryption process 1100 accesses a user-authentication dataset relating to a user of the data processing system. At Step 1108, encryption process 1100 generates an encryption key dataset derived from the user-authentication dataset and the encryption key strength. At Step 1110, encryption process 1100 encrypts the computerized data file using the encryption key dataset, thereby obtaining an encrypted data file. At Step 1112, encryption process 1100 stores the encrypted data file obtained at Step 1110 and the encryption key dataset generated at Step 1108. More specific embodiments of this aspect include corresponding computer system(s), device(s), apparatus, and computer programs recorded on one or more computer storage devices, configured to perform the actions of the methods. As described herein, implementations of the method may further include one or more of the following features: (1) the user-authentication dataset may include a multi-factor authentication dataset, and/or biometric data relating to a user of the data processing system; and (2) the encryption key dataset derived from the user-authentication dataset and the encryption key strength (Step 1108) may include a sub-process that (i) merges the user-authentication dataset with a cryptographic initialization vector dataset associated with the encryption key dataset, thereby generating a restricted access cryptographic initialization vector dataset associated with the encryption key dataset, and (ii) replaces the cryptographic initialization vector dataset with the restricted access cryptographic initialization vector dataset associated with the encryption key dataset.

Example Decryption Using the Data Encryption Key

Figure 12:
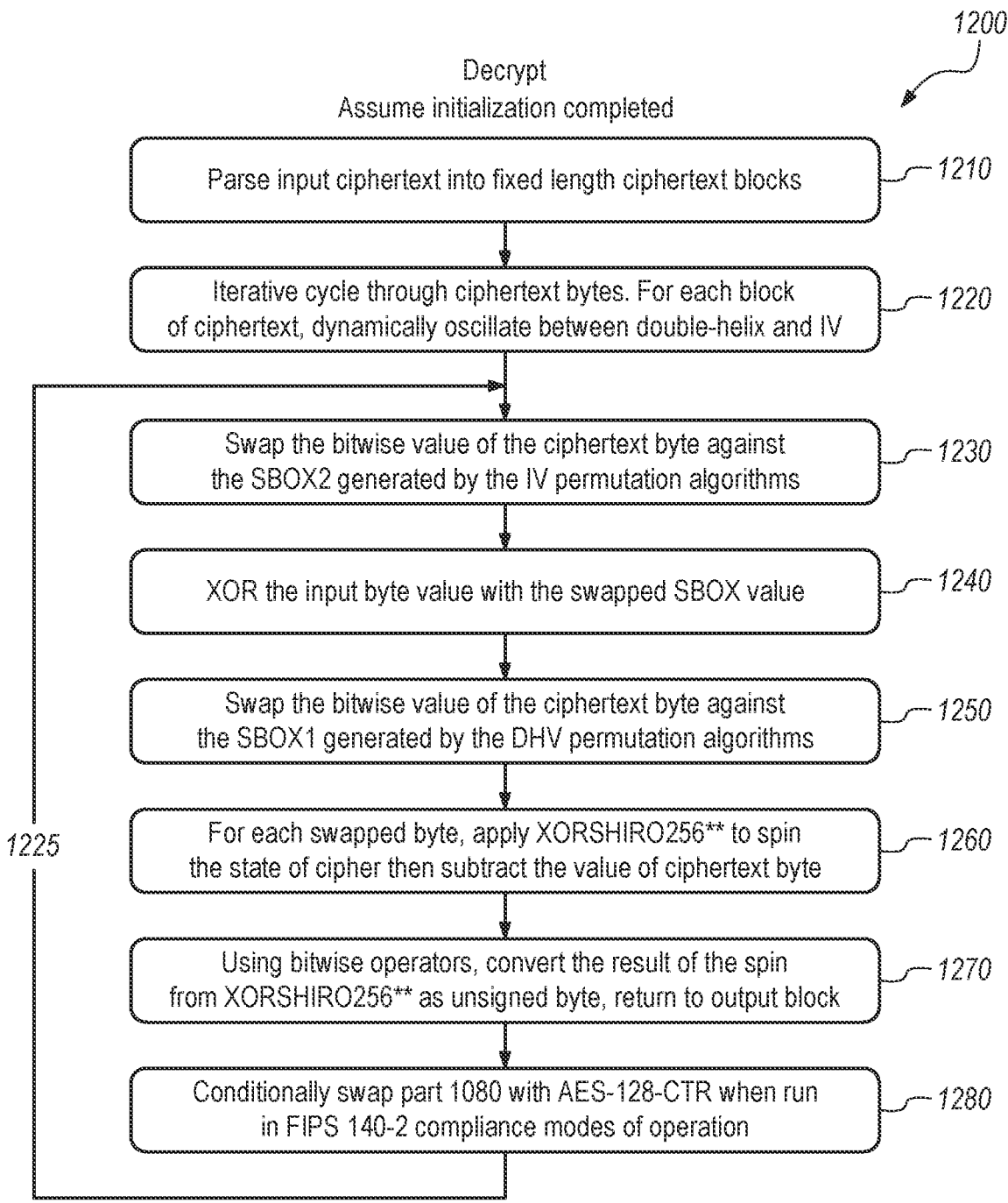
FIG. 12 presents a flowchart for one embodiment of a decryption process of the present disclosure.

FIG. 12 presents a flowchart for one embodiment of a decryption process 1200 relating to a symmetric encryption cipher with steganographically embedded access controls of the present disclosure. In this embodiment, decryption process 1200 is an exemplary decryption process that operates to decrypt ciphertext generated by encryption process 1000, described above with respect to FIG. 10. Referring to FIG. 12, in this embodiment, decryption process 1200 performs the following steps once initialization process 900' is complete. At Step 1210, decryption process 1200 parses ciphertext into fixed length ciphertext blocks. At Step 1220, decryption process 1200 iteratively cycles through ciphertext bytes and Steps 1230 through 1270; in this embodiment, for each block of ciphertext, decryption process 1200 dynamically oscillates between DHV and IV. At Step 1230, decryption process 1200 swaps the bitwise value of a ciphertext byte against the S-BOX2 generated by the IV permutation algorithms. At Step 1240, decryption process 1200 performs an XOR operation on the key byte value with the swapped S-BOX2 value. At Step 1250, decryption process 1200 swaps the bitwise value of the ciphertext byte against the S-BOX1 generated by the DHV permutation algorithms. At Step 1260, for each byte swapped at Step 1240, decryption process 1200 applies XORSHIRO256 to spin the state of cipher and then subtracts the value of the spin state from the ciphertext byte. At Step 1270, and using bitwise operators, decryption process 1200 converts the result of the spin operation (at Step 1260) from XOR-SHIRO256 as unsigned byte, and returns it to next output block of cleartext (via iterative processing loop 1225). In some embodiments, decryption process 1200 conditionally swaps the result of Step 1260 with AES-128-CTR when run in FIPS 140-2 compliance modes of operation.

Figure 13:
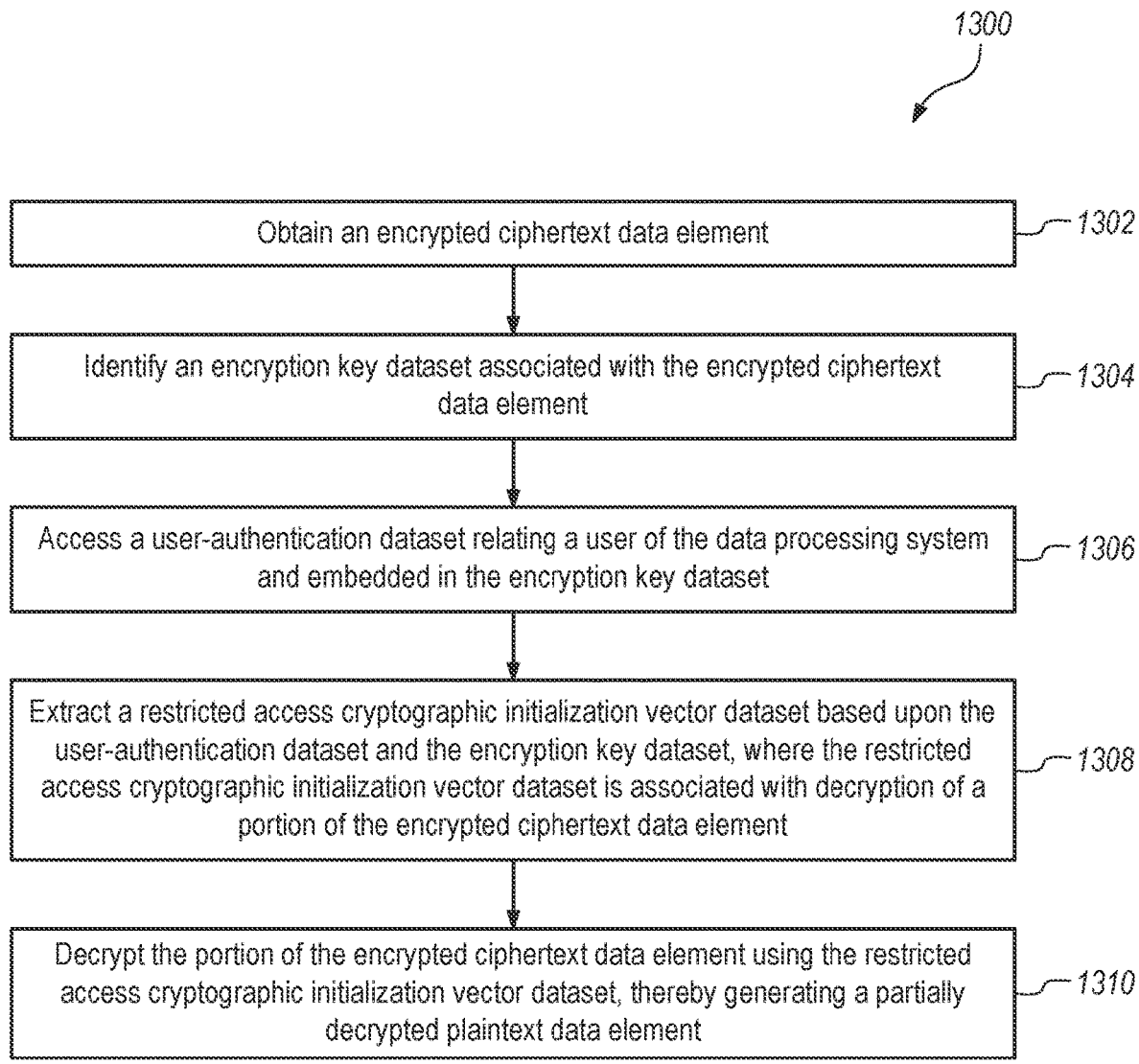
FIG. 13 presents a flowchart for yet another aspect for one embodiment of a decryption process of the present disclosure.

FIG. 13 presents a higher-level flowchart for describing one general aspect for embodiments of a decryption process of present disclosure. Referring to FIG. 13, in some embodiments, a more general aspect of the system and methods of the symmetric cipher disclosed herein includes a non-transitory computer-readable program which, when executing on a computing device, causes the computing device of a data processing system, to perform a decryption process 1300 by executing the following steps. At Step 1302, decryption process 1300 obtains an encrypted ciphertext data element. At Step 1304, decryption process 1300 identifies an encryption key dataset associated with the encrypted ciphertext data element. At Step 1306, decryption process 1300 accesses a user-authentication dataset relating to a user of the data processing system and embedded in the encryption key dataset. At Step 1308, decryption process 1300 extracts a restricted access cryptographic initialization vector dataset from the encryption key dataset, based upon the user-authentication dataset and the encryption key dataset, where the restricted access cryptographic initialization vector dataset is associated with decryption of a portion of the encrypted ciphertext data element. At Step 1308, decryption process 1300 decrypts the portion of the encrypted ciphertext data element using the restricted access cryptographic initialization vector dataset, thereby generating a partially decrypted (effectively redacted) plaintext data element. Other embodiments of this aspect include corresponding computer system(s), device(s) apparatus, and computer program(s) recorded on one or more computer storage devices, configured to perform the actions of the methods. Additional implementations may further include aspects where the user-authentication dataset includes biometric and/or multi-factor authentication data relating to the user; and/or where the encrypted ciphertext data element may include streaming data; and/or where the partially decrypted plaintext data element includes streaming data. Such implementations of each of the described techniques may include hardware, a method or process, or computer software on a computer-accessible medium.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this disclosure are not necessarily all referring to the same embodiment. Furthermore, the particular features, structures or characteristics may be combined in any suitable manner as would be apparent to one skilled in the art.

Similarly, it should be appreciated that in the above description of the exemplary embodiments described herein, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that the specific coding used to implement the disclosed symmetric encryption cipher with steganographically embedded access controls has not been discussed in detail, since the system and methods disclosed herein are not limited to a specific coding method or implementation. Thus, for example, the blending of biometric data with a cryptograph initialization vector can be implemented in a variety of coding languages and methods and incorporated separately into known cryptograph processes that do not necessarily employ steganographically embedded access control lists; the present disclosure is not limited to specifically described contexts and may be utilized in various other applications and systems, for example in a system that other binary digital encryption. Furthermore, the present disclosure does not limit implementation of the system and methods disclosed herein to any one type of network architecture and/or method of encapsulation, and thus may be utilized in conjunction with one or a combination of other network architectures/protocols.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention. Thus, while certain embodiments of the invention described herein, those skilled in the art will recognize that other and further modifications may be made thereto without departing from the spirit of the disclosure, which is intended to cover all such changes and modifications as fall within the scope of the invention. For example, any formulas, pseudo-code, processes, data structures and devices described in detail herein are representative of procedures and systems that may be used. Functionality may be added or deleted from the block diagrams, and operations may be interchanged among functional blocks. Steps may be added or deleted to methods described and yet remain within the scope of the present disclosure.

What is claimed is:

1. A non-transitory computer-readable program which, when executed on a computing device of a data processing system, causes the computing device to:
   generate a data structure relating to a cryptographic key of an invariant size and a variable encryption strength, the data structure comprising a plurality of adjacent data stores further comprising:
   a first data store having a first variable size, wherein the first data store is operable to contain a first dataset representing an initialization vector of a cipher relating to the cryptographic key, and wherein the first variable size corresponds to the variable encryption strength of the cryptographic key;
   a second data store operable to contain a second dataset representing a delimiter space associated with the variable encryption strength of the cryptographic key, wherein the second data store is adjacent to the first data store;
   a third data store having a second variable size, wherein the third data store is operable to contain a third dataset representing a variable padding space of the cryptographic key, wherein the third data store is separated from the first data store by at least the second data store in the plurality of adjacent data stores, and wherein the second variable size is dynamically coupled to the first variable size and inversely related to the variable encryption strength of the cryptographic key;
   a fourth data store having a third variable size, wherein the fourth data store is operable to contain a fourth dataset representing a seed array relating to the cryptographic key;
   a central data store portion positioned within the plurality of adjacent data stores to define a dynamic delimiter within the data structure, and wherein the fourth data store is positioned within the data structure symmetrically with respect to the dynamic delimiter and the first data store;
   a fifth data store operable to contain a fifth dataset representing a second delimiter space associated with the variable encryption strength of the cryptographic key, wherein the fifth data store is adjacent to the fourth data store and proximal to the central data store portion; and
   a sixth data store having a fourth variable size equal to the second variable size, wherein the sixth data store is operable to contain a sixth dataset representing a second variable padding space of the cryptographic key, wherein the sixth data store is separated from the fourth data store by at least the fifth data store in the plurality of adjacent data stores, and wherein the fourth variable size is dynamically coupled to the third variable size and inversely related to the variable encryption strength of the cryptographic key.

2. The non-transitory computer-readable program of claim 1, which, when executed on the computing device of the data processing system, further causes the computing device to store, within the third data store, an access control dataset relating to information used to enable encryption and decryption of a computerized information dataset using the cryptographic key.

3. The non-transitory computer-readable program of claim 2, wherein the access control dataset includes biometric data of a user of the computing device.

4. The non-transitory computer-readable program of claim 2, wherein the access control dataset includes data identifying a portion of the computerized information dataset subject to decryption by the cryptographic key.

5. The non-transitory computer-readable program of claim 2, wherein the plurality of adjacent data stores further comprises a terminal dataset associated with a key-encryption-key dataset, and wherein the key-encryption-key dataset is operable to be used by the computing device to encrypt at least a portion of the access control dataset.

6. The non-transitory computer-readable program of claim 5, wherein the terminal dataset indicates availability of the access control dataset stored within the third data store.

7. A non-transitory computer-readable program which, when executed on a computing device of a data processing system, causes the computing device to:
   obtain a user-authentication dataset associated with encrypting and decrypting a computerized data file;
   define a cryptographic key data structure of invariant size, wherein the cryptographic key data structure comprises an encryption-key data store of variable key-bit space and a padding data store of variable padding-bit space;
   generate a key-encryption-key dataset;

encrypt the user-authentication dataset using the key-encryption-key dataset, thereby generating an encrypted authentication dataset;

embed the encrypted authentication dataset within the padding data store of variable padding space;

store the key-encryption-key dataset within at least one data store of the cryptographic key data structure;

merge the user-authentication dataset with a data-encryption-key dataset, thereby creating a restricted access cryptograph initialization vector dataset relating to the data-encryption-key dataset; and store the restricted access cryptograph initialization vector dataset in the cryptographic key data structure.

8. The non-transitory computer-readable program of claim 7, wherein the user-authentication dataset associated with encrypting and decrypting the computerized data file comprises biometric data of a user of the data processing system.

9. The non-transitory computer-readable program of claim 7, wherein the user-authentication dataset associated with encrypting and decrypting the computerized data file comprises a multi-factor authentication dataset.

10. The non-transitory computer-readable program of claim 9, wherein the multi-factor authentication dataset associated with encrypting and decrypting the computerized data file comprises an access-control dataset encoding a set of information associated with conditional access to the computerized data file.

11. The non-transitory computer-readable program of claim 10, wherein the access-control dataset comprises a subset of access-control data encoding redaction information associated with restricted access to a portion of the computerized data file.

12. A non-transitory computer-readable program which, when executed on a computing device of a data processing system, causes the computing device to:

obtain, in the data processing system, a computerized data file;

establish, in the data processing system, an encryption key strength from a plurality of variable key strengths;

access, in the data processing system, a user-authentication dataset relating a user of the data processing system;

generate, in the data processing system, an encryption key dataset derived from the user-authentication dataset and the encryption key strength;

encrypt, in the data processing system, the computerized data file using the encryption key dataset, thereby obtaining an encrypted data file;

store, in the data processing system, the encrypted data file and the encryption key dataset;

merge, in the data processing system, the user-authentication dataset with a cryptographic initialization vector dataset associated with the encryption key dataset, thereby generating a restricted access cryptographic initialization vector dataset associated with the encryption key dataset; and replace, in the data processing system, the cryptographic initialization vector dataset with the restricted access cryptographic initialization vector dataset associated with the encryption key dataset.

13. The non-transitory computer-readable program of claim 12, wherein the user-authentication dataset comprises a multi-factor authentication dataset.

14. The non-transitory computer-readable program of claim 12, wherein the user-authentication dataset comprises biometric data relating to the user of the data processing system.

* * * * *